(12) United States Patent
Shiraki et al.

(10) Patent No.: US 10,382,250 B2
(45) Date of Patent: Aug. 13, 2019

(54) INFORMATION PROCESSING SYSTEM AND CONTROL METHOD FOR INFORMATION PROCESSING SYSTEM

(71) Applicants: FUJITSU LIMITED, Kawasaki-shi, Kanagawa (JP); FUJITSU ADVANCED ENGINEERING LIMITED, Tokyo (JP)

(72) Inventors: Osamu Shiraki, Kawasaki (JP); Hiroyuki Esashi, Tokyo (JP)

(73) Assignees: FUJITSU LIMITED, Kawasaki (JP); FUJITSU ADVANCED ENGINEERING LIMITED, Tokyo (JP)

( * ) Notice: Subject to any disclaimer, the term of this patent is extended or adjusted under 35 U.S.C. 154(b) by 159 days.

(21) Appl. No.: 14/974,001

(22) Filed: Dec. 18, 2015

(65) Prior Publication Data

US 2016/0191299 A1    Jun. 30, 2016

(30) Foreign Application Priority Data

Dec. 24, 2014   (JP) ................................ 2014-260324

(51) Int. Cl.
*H04L 12/28* (2006.01)
*H04L 12/24* (2006.01)
(Continued)

(52) U.S. Cl.
CPC .......... *H04L 41/044* (2013.01); *H04L 45/74* (2013.01); *H04L 49/25* (2013.01); *H04L 49/351* (2013.01); *H04L 49/357* (2013.01)

(58) Field of Classification Search
CPC ....... H04L 41/044; H04L 45/74; H04L 49/25; H04L 49/35; H04L 49/351
(Continued)

(56) References Cited

U.S. PATENT DOCUMENTS 9,641,249 B2 *   5/2017   Kaneriya ............... H04B 10/25
2007/0233704 A1 * 10/2007  Shiga .................. H04L 67/1095
(Continued)

FOREIGN PATENT DOCUMENTS

EP    2 981 029 A1    2/2016
JP    2008-186377     8/2008
(Continued)

OTHER PUBLICATIONS

Extended Search Report dated May 4, 2016 in European Patent Application No. 15200624.3.
(Continued)

*Primary Examiner* — Phuongchau Ba Nguyen
(74) *Attorney, Agent, or Firm* — Xsensus LLP

(57) ABSTRACT

A disclosed system includes plural switches, a node, and a management apparatus. The node includes: a transmitter that transmits an assignment request whose destination is the management apparatus. The management apparatus includes: a determination unit that determines whether an identifier can be assigned to the node, based on the assignment request; and a transmitter that transmits a response including an identifier assigned to the node. And a first switch that is a switch of the plural switches and relays the assignment request and the response includes: a making unit that makes settings for relaying a packet whose destination is the node; and a transmitter that transmits, to other switches belonging to a domain to which the first switch belongs, a setting request including the information on the logical link that received the assignment request and the identifier included in the response.

12 Claims, 40 Drawing Sheets

(51) Int. Cl.
*H04L 12/947* (2013.01)
*H04L 12/741* (2013.01)
*H04L 12/931* (2013.01)

(58) Field of Classification Search
USPC ....... 370/392, 254, 401, 413, 357, 400, 419,
370/255, 389, 351, 359, 395.53, 403, 409,
370/428, 431, 462, 463, 471
See application file for complete search history.

(56) References Cited

U.S. PATENT DOCUMENTS

| | | | |
|---|---|---|---|
| 2008/0215809 A1 | 9/2008 | Otaka et al. | |
| 2009/0067348 A1* | 3/2009 | Vasseur | H04L 45/04 370/256 |
| 2012/0106957 A1* | 5/2012 | Willeke | H04L 29/12207 398/58 |
| 2014/0064056 A1* | 3/2014 | Sakata | H04L 41/00 370/216 |
| 2014/0092912 A1* | 4/2014 | Hathorn | H04L 49/351 370/401 |
| 2014/0126352 A1 | 5/2014 | Tatsumi et al. | |
| 2014/0286175 A1 | 9/2014 | Shiraki | |
| 2014/0307578 A1 | 10/2014 | Desanti | |
| 2014/0365622 A1* | 12/2014 | Iyengar | H04L 67/1097 709/220 |
| 2015/0333928 A1 | 11/2015 | Shiraki | |

FOREIGN PATENT DOCUMENTS

| | | |
|---|---|---|
| JP | 2012-114894 A | 6/2012 |
| JP | 2014-96682 | 5/2014 |
| JP | 2014-165521 A | 9/2014 |
| WO | 2013/099080 A1 | 7/2013 |
| WO | WO 2014/157549 A1 | 10/2014 |

OTHER PUBLICATIONS

Office Action dated Jan. 4, 2018 in European Patent Application No. 15 200 624.3.
Notification of Reasons for Refusal issued in corresponding Japanese Application No. 2014-260324 dated Aug. 21, 2018 (with English translation).

* cited by examiner

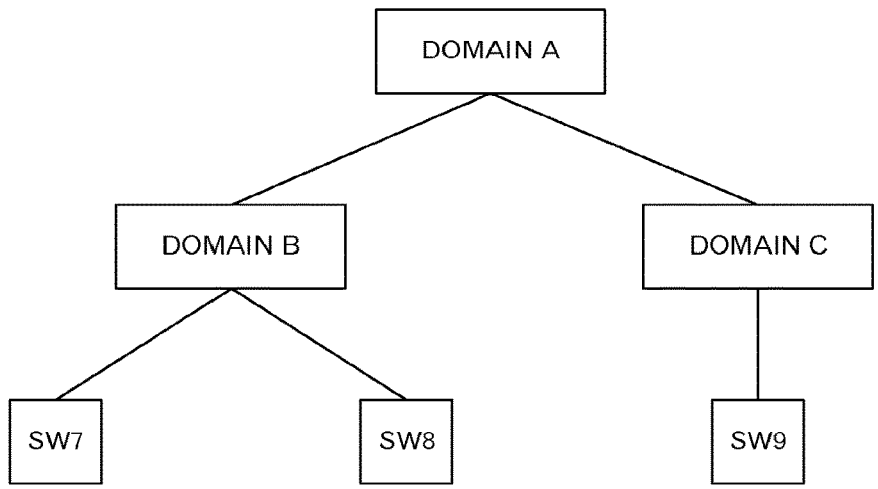
FIG.2
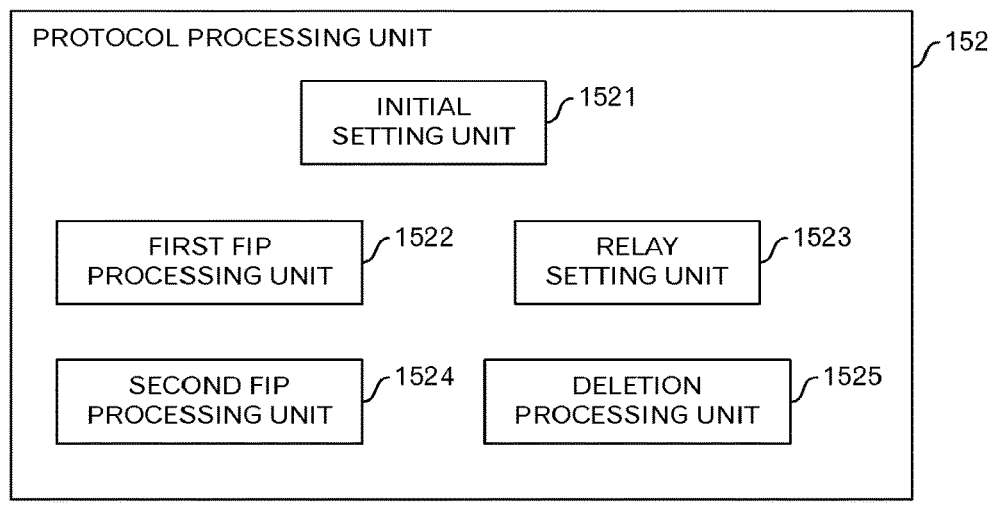
FIG.4
| INFO | PORT | FPMA | FCID |
|---|---|---|---|
| SA1, WWPN1 | PORT1 | FPMA1 | FCID1 |
| SA2, WWPN2 | PORT2 | FPMA2 | FCID2 |
| ⋮ | ⋮ | ⋮ | ⋮ |
FIG.5

| Match | | | Action | |
|---|---|---|---|---|
| DA | D-ID | OX-ID | Modify | Fwd |
| $MAC_{FCF}$ | $FCID_{S1}$ | * | $DA \leftarrow MAC_{S1}$<br>$SA \leftarrow MAC_{FCF}$ | 1 |
| * | $FCID_{S1}$ | * | N/A | 1 |

| INFO | SW-ID, PORT-ID | FPMA | FCID |
|---|---|---|---|
| SA1, WWPN1 | SW1, PORT1 | FPMA1 | FCID1 |
| SA2, WWPN2 | SW3, PORT2 | FPMA2 | FCID2 |
| ⋮ | ⋮ | ⋮ | ⋮ |

INFORMATION PROCESSING SYSTEM AND CONTROL METHOD FOR INFORMATION PROCESSING SYSTEM

CROSS-REFERENCE TO RELATED APPLICATIONS

This application is based upon and claims the benefit of priority of the prior Japanese Patent Application No. 2014-260324, filed on Dec. 24, 2014, the entire contents of which are incorporated herein by reference.

FIELD

This invention relates to an information processing system and a control method for the information processing system.

BACKGROUND

Fibre Channel over Ethernet (FCoE) is a technique that makes it possible to perform Fibre Channel (FC) communication over an Ethernet (registered trademark), which is the de facto standard in a Storage Area Network (SAN). With FCoE it is possible to integrate both a Local Area Network (LAN) by Ethernet and SAN, which are individually deployed, into one network. As a result, it is possible to reduce by half the number of switches, adapters and cables, and simplify network management.

In an FCoE network, there is at least one FCoE Forwarder (FCF), which is a device in which a Fibre Channel Mapper (FCM) is implemented. The FCF executes encapsulation and decapsulation of packets, and FIP (FCoE Initialization Protocol) processing.

In an FCoE network, when relaying a packet so as to pass through the FCF, there is a problem in that the path of the packet from the transmission source to the destination may not be the shortest path (in other words, a wasteful path occurs). On the other hand, when a specific device (for example, a FCF) makes relay settings for each of the switches so that packets are not relayed by way of the FCF, there is a problem in that there occurs a concentrated processing load in the device. In the conventional techniques, sufficient research has not been performed in regard to these problems.

Patent Document 1: Japanese Laid-open Patent Publication No. 2014-96682

Patent Document 2: Japanese Laid-open Patent Publication No. 2008-186377

SUMMARY

An information processing system relating to this embodiment includes: plural switches connected in a tree form; an information processing apparatus connected to one of the plural switches; and a management apparatus connected to one of the plural switches, which manages assignment of identifiers. And the information processing apparatus includes: a first memory; and a first processor configured to use the first memory and execute a first process. And the first process includes: transmitting an assignment request whose destination is the management apparatus. And the management apparatus includes: a second memory; and a second processor configured to use the second memory and execute a second process. And the second process includes: determining whether an identifier can be assigned to the information processing apparatus, based on the received assignment request; and transmitting a response that includes an identifier assigned to the information processing apparatus, upon determining that the identifier can be assigned to the information processing apparatus. And a first switch that is a switch of the plural switches and relays the assignment request and the response includes: a third memory; and a third processor configured to use the third memory and execute a third process. And the third process includes: making settings for relaying a packet whose destination is the information processing apparatus, based on information on a logical link that received the assignment request and the identifier included in the response; and transmitting, to first other switches that belong to a first domain to which the first switch belongs, a setting request that includes the information on the logical link that received the assignment request and the identifier included in the response.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a logic diagram depicting connections between domains and connections between a domain and one switch;

FIG. 4 is a functional block diagram of a protocol processing unit;

FIG. 5 is a diagram depicting an example of a FLOGI table;

DESCRIPTION OF EMBODIMENTS

Embodiment 1

Figure 1:
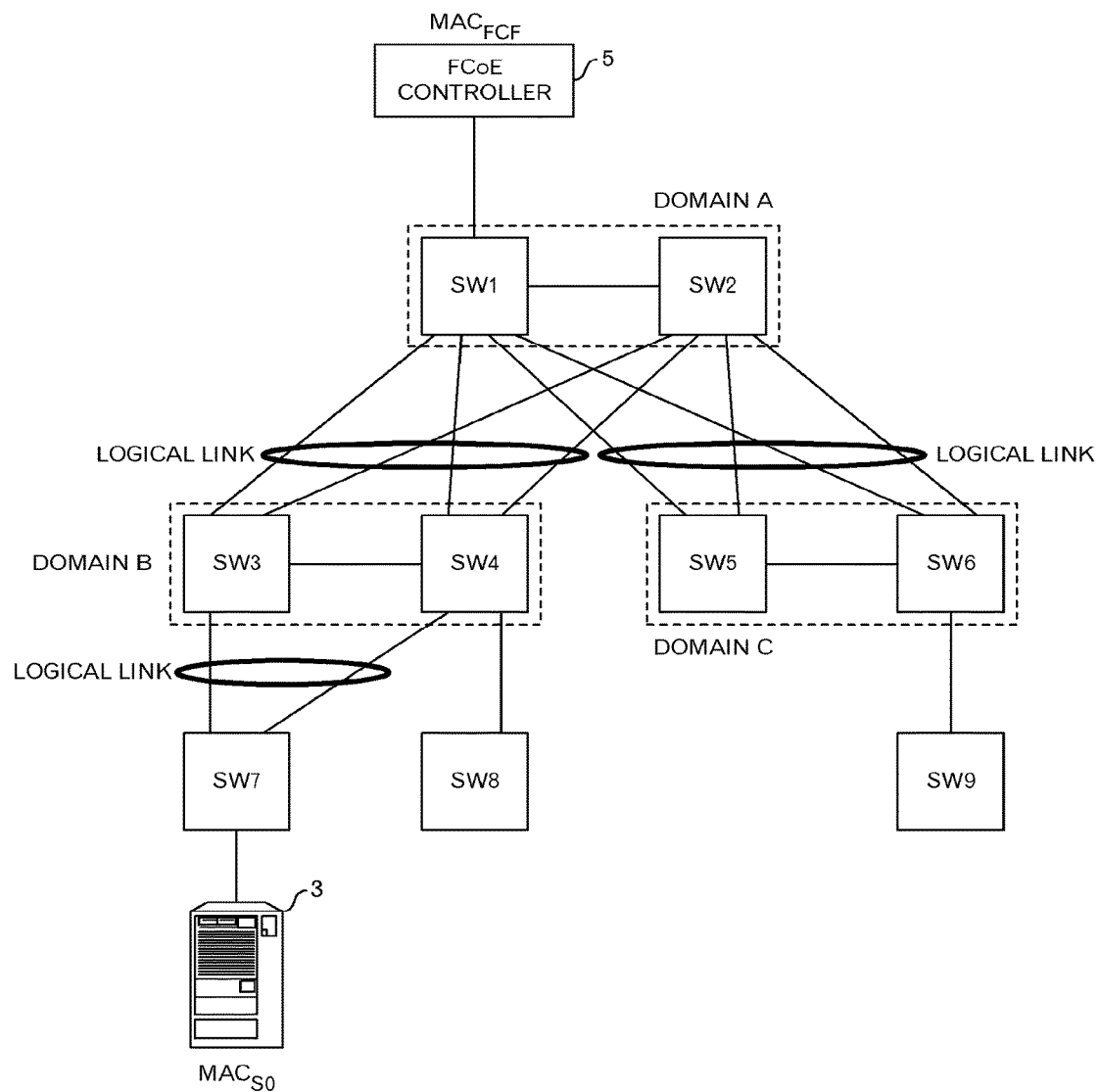
FIG. 1 is a diagram depicting an outline of a system relating to this embodiment.

FIG. 1 illustrates an outline of a system of this embodiment. In this embodiment, switches SW1 to SW9, which are switches that comply with FCoE, are connected in a tree form, for example. And the switches SW1 to SW6 are managed in the unit called domain. More specifically, the switches SW1 and SW2 belong to a domain A, the switches SW3 and SW4 belong to a domain B and the switches SW5 and SW6 belong to a domain C. An end node 3 is connected to the switch SW7, and an FCoE controller 5 is connected to the switch SW1. In FIG. 1, the number of end nodes is one, however, the number is not particularly limited.

Plural physical links between the domain A and the domain B are treated as one logical link by MLAG (Multi-chassis Link-Aggregation Group). Plural physical links between the domain A and the domain C are also treated as one logical link by MLAG. Plural physical links between the domain B and the switch SW7 are also treated as one logical link by MLAG. FIG. 2 is a logic diagram that illustrates connections between domains and connections between a domain and one switch. As illustrated in FIG. 2, a logical loop is prohibited in connections between domains and connections between a domain and one switch.

The FCoE controller 5 is a device (for example, a server) having a control function of the FCF. However, the FCoE controller 5 does not have a data relay function of the FCF.

The control function includes a function that receives, from an end node, a FLOGI (Fabric LOGIn) packet which is a packet that requests login, outputs a FLOGI ACC (ACCept) packet that includes a FCID (Fibre Channel IDentifier) and a FPMA (Fabric Provided MAC Address) when the login is successful, and outputs a FLOGI RJT (ReJecT) packet when login fails. In this function, a FDISC (Fabric Discovery) packet that is issued at login on a virtual link established by FLOGI is also handled in the same way as a FLOGI packet. Moreover, the control function includes a function of terminating a login state when a LOGO (LOGOut) packet, which is a packet requesting logout, is received from an end node, or when a timeout for maintaining a virtual link occurs. In the latter case, a CVL (Clear Virtual Link) command is transmitted, and the virtual link is deleted. Furthermore, the control function includes a name server function, however, this function is not directly related to this embodiment, so the explanation is omitted.

The data relay function has a function that relays an FCoE packet to a device having a destination FCID, and a function that converts an Ethernet header when relaying a packet. A destination MAC (Media Access Control) address that is transmitted from an end node is a MAC address of the FCF, and a transmission source MAC address is a MAC address that is assigned to the end node. In the case of the latter function, the destination MAC address is converted to a MAC address that is assigned to a final destination end node, and the transmission source MAC address is converted to a MAC address of the FCF. Assume that a MAC address $MAC_{SO}$ is assigned to the end node 3, and a MAC address $MAC_{FCF}$ is assigned to the FCoE controller 5.

Figure 3:
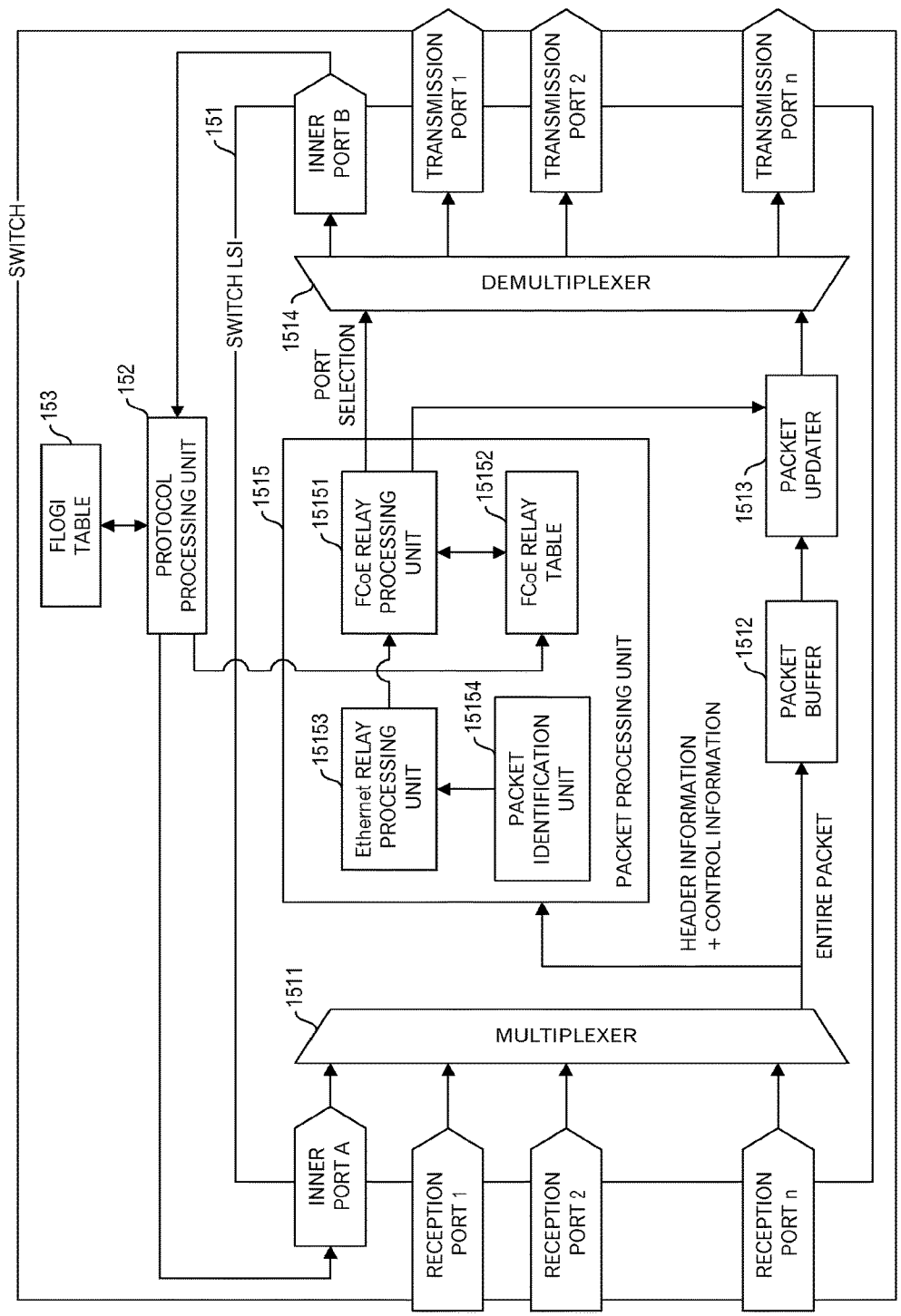
FIG. 3 is a functional block diagram of a switch.

FIG. 3 is a functional block diagram of the switches SW1 to SW6. The switches SW1 to SW6 have: reception ports 1 to n that are connected to external devices and receive packets from the external devices; transmission ports 1 to n that are connected to the external devices and transmit packets to the external devices; a switch LSI (Large Scale Integration) 151; and a protocol processing unit 152 that is achieved, for example, by combining a processor and a program; and a FLOGI table 153 that is managed by the protocol processing unit 152. The protocol processing unit 152 may also be implemented by a dedicated LSI. The switches SW7 to SW9 may be typical Ethernet switches.

Here, the protocol processing unit 152 will be explained. FIG. 4 is a functional block diagram of the protocol processing unit 152. The protocol processing unit 152 has an initial setting unit 1521, a first FIP (FCoE Initialization Protocol) processing unit 1522, a relay setting unit 1523, a second FIP processing unit 1524, and a deletion processing unit 1525.

The initial setting unit 1521 executes an initial setting processing when the switches are activated. The first FIP processing unit 1522 executes processing for FLOGI packets, FLOGI ACC packets, FLOGI RJT packets, FDISC packets, FDISC ACC packets and FDISC RJT packets based on data that is stored in the FLOGI table 153. The relay setting unit 1523 adds entries to the FCoE relay table 15152. The second FIP processing unit 1524 executes processing for LOGO packets, LOGO ACC packets, LOGO RJT packets and CVL packets based on data that is stored in the FLOGI table 153. The deletion processing unit 1525 deletes entries that are stored in the FCoE relay table 15152.

FIG. 5 illustrates an example of the FLOGI table 153. In the example in FIG. 5, information that includes a transmission source MAC address and a transmission source World Wide Port Name (WWPN) of a FLOGI packet and a FDISC packet, an identifier of a port, a FPMA that is assigned to a login port, and a FCID that is assigned to the login port are stored.

The FCID is used for routing in FC. The FCID is designated by 3 octets; for example, in the case of 0xXXYYZZ in hexadecimal, XX is a Domain ID, YY is an Area ID, and ZZ is a Port ID. In FC, the Domain ID is an ID that is individually given to each switch when forming a SAN with plural FC switches (FC-SW). The Domain ID is 8 bits, and it is possible to connect a maximum of 239 switches in a network.

Returning to the explanation of FIG. 3, the switch LSI 151 has a multiplexer 1511 that is connected to the reception ports 1 to n and an inner port A, a packet buffer 1512, a packet processing unit 1515, a packet updater 1513, and a demultiplexer 1514 that is connected to the transmission ports 1 to n and an inner port B.

An entire packet received by the multiplexer 1511 is stored in the packet buffer 1512. Moreover, header information and control information of a packet received by the multiplexer 1511 is outputted to the packet processing unit 1515.

The packet updater 1513 performs processing (also called modification or conversion processing) to update a header of a packet according to an instruction from the packet processing unit 1515. Moreover, the demultiplexer 1514 outputs a packet to a selected transmission port according to a port selection instruction from the packet processing unit 1515.

The packet processing unit 1515 has, as component elements related to this embodiment, an FCoE relay processing unit 15151, an FCoE relay table 15152, an Ethernet relay processing unit 15153 and a packet identification unit 15154. The Ethernet relay processing unit 15153 executes processing for relaying packets over an Ethernet network based on an Ethernet relay table, and the packet identification unit 15154 executes processing for identifying a packet received by a switch based on a packet identification table. However, the processing by the Ethernet relay processing unit 15153 and packet identification unit 15154 is not a main element of this embodiment, so the explanations thereof are omitted.

The protocol processing unit 152 is connected to the switch LSI 151 by the inner port A and the inner port B. This protocol processing unit 152 performs processing for establishing connections, monitoring protocol and giving instructions to the switch LSI 151. This processing is not directly related to this embodiment, so no more will be mentioned about it.

Figures 6, 7:
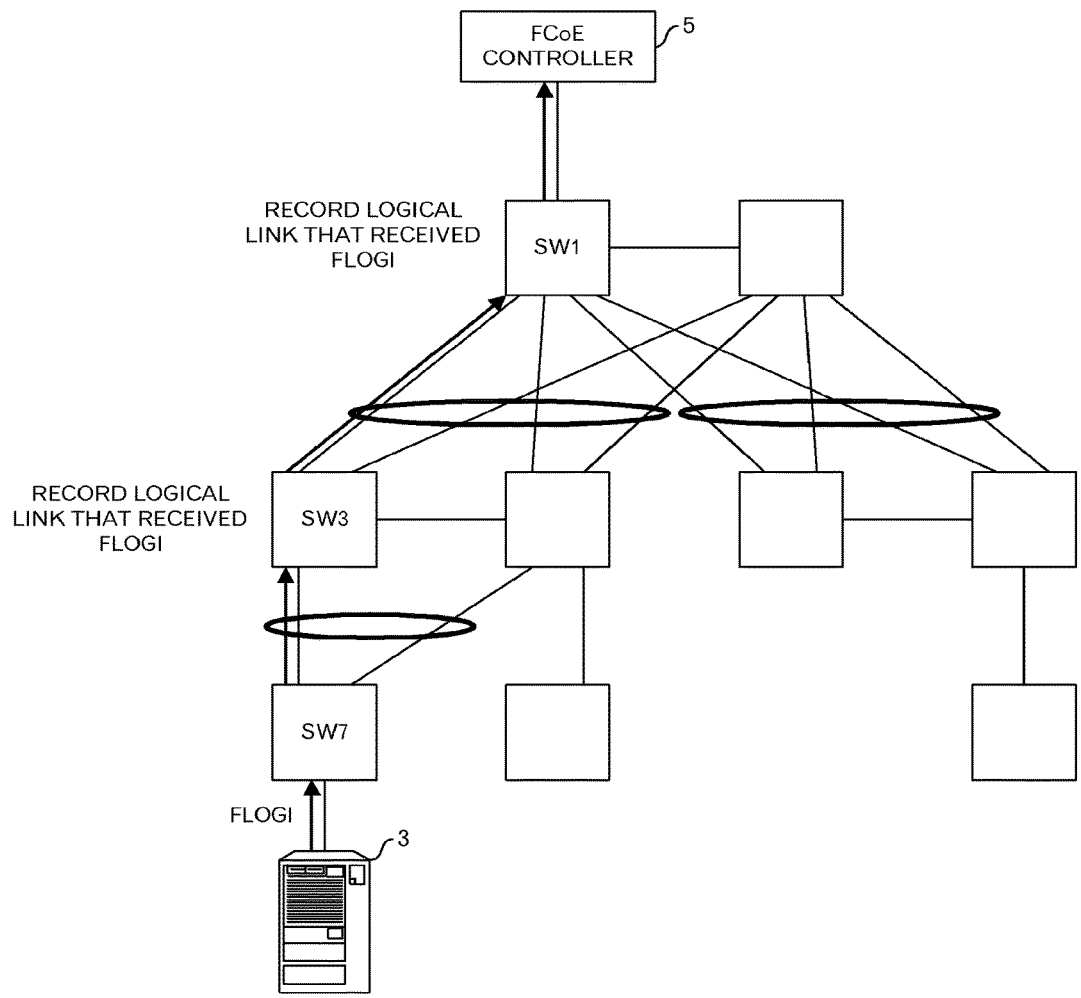
FIG. 6 is a diagram depicting an example of an FCoE relay table.
FIG. 7 is a diagram for explaining an outline of processing performed in a first embodiment.

FIG. 6 illustrates an example of the FCoE relay table 15152. A condition portion represented as Match and processing that is represented as Action and is to be executed when a condition is satisfied are specified in the FCoE relay table 15152.

More specifically, a Match column includes: a DA (Destination MAC Address) column in which a MAC address that is to be compared with a DA of a destination end node in a received packet is set; a D-ID column in which a FCID that is to be compared with a FCID of the destination end node in a received packet (D-ID (FC Destination ID)) is set; and an exchange ID (OX-ID (FC Exchange ID), an ID for communication management, which is included in a header of an FC frame) column in which an OX-ID that is to be compared with an OX-ID of FC in a received packet is set.

The first line in the example in FIG. 6 represents a condition that the DA in the received packet is a MAC address of FCF, and the D-ID is a FCID of an end node S1. Here, an asterisk "*" represents a wild card, and is determined to be a match no matter what the value is. N/A represents that an item is not applicable. Moreover, the second line in the example in FIG. 6 represents that the D-ID is the FCID of the end node S1.

Moreover, the Action column includes a Modify column that specifies modification processing for a header of a received packet, and a Fwd column that represents a transfer destination port number of the packet. In the first line in FIG. 6, processing for setting a MAC address of the destination end node S1 for the DA, and processing for setting a MAC address of the FCF for a Source Address (SA), which is a MAC address of the transmission source, are specified, and outputting the received packet to the transmission port 1 is specified. In the second line in FIG. 6, there is no need to modify the header, and outputting the received packet to the transmission port 1 is specified.

In this kind of the FCoE relay table 15152, the higher the line is, the higher the priority is, so conditions that are specified in the Match column are used for comparison from the top down, and processing that is specified in the line of the first match is executed. However, it is also possible to provide a priority column in the FCoE relay table 15152, and to perform comparison according to values stored in the priority column.

In this embodiment, first, a FCF MAC address is set as a destination MAC address, however, a header modification that sets the FCF MAC address for a transmission source MAC address is performed together with setting a MAC address of a destination end node for a destination MAC address at one of switches that relay the packet.

Next, an outline of processing that is performed in a first embodiment will be explained by using FIGS. 7 to 19.

For example, as illustrated in FIG. 7, assume that the end node 3 outputted a FLOGI packet. The switch SW7 that received the FLOGI packet from the end node 3 relays the FLOGI packet to the switch SW3. The switch SW3 that received the FLOGI packet from the switch SW7 stores an identifier or the like for a logical link that received the FLOGI packet in the FLOGI table 153, and relays the FLOGI packet to the switch SW1. The switch SW1 that received the FLOGI packet from the switch SW3 stores an identifier or the like for the logical link that received the FLOGI packet in the FLOGI table 153, and relays the FLOGI packet to the FCoE controller 5.

Figure 8:
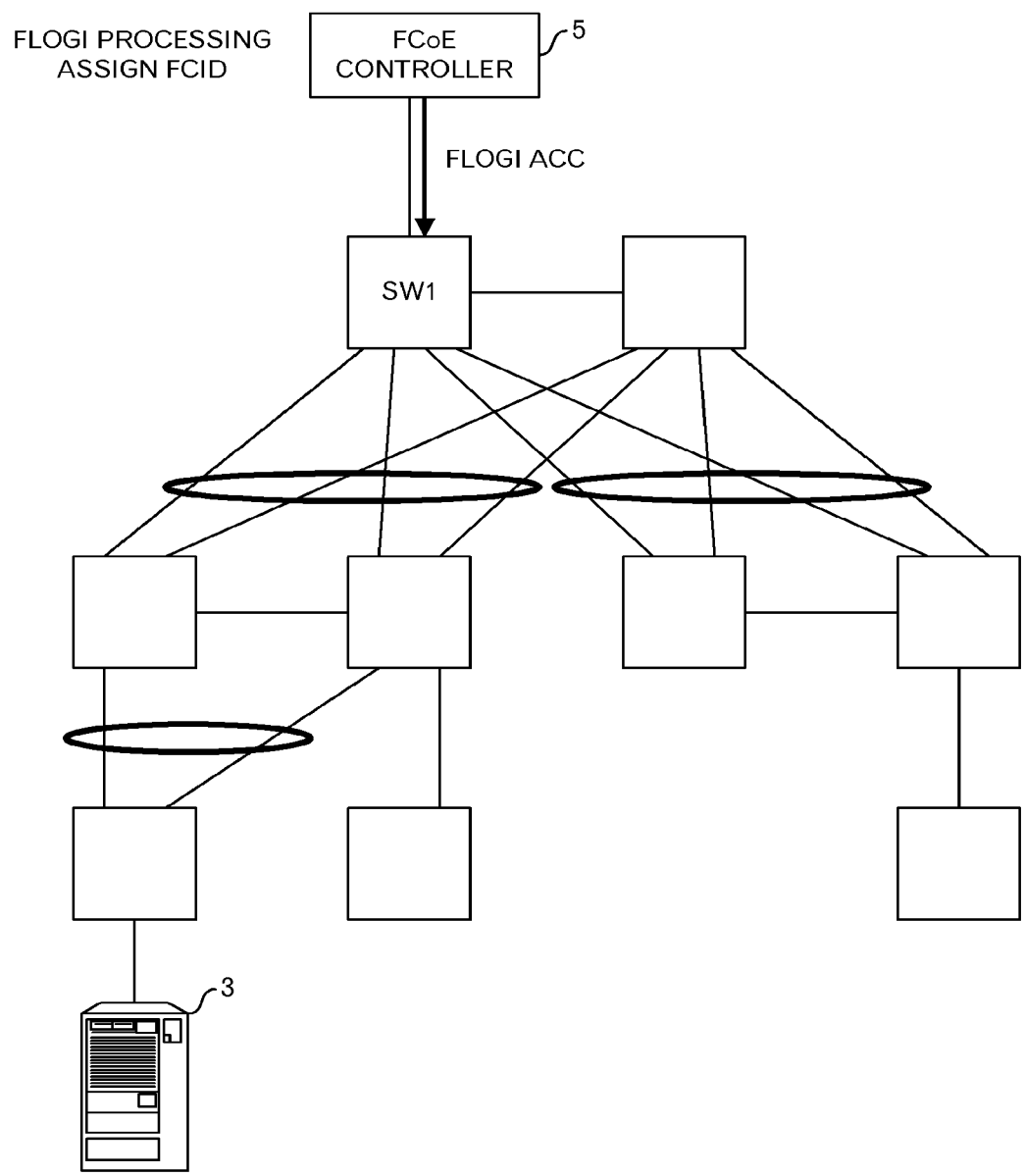
FIG. 8 is a diagram for explaining the outline of the processing performed in the first embodiment.

Then, as illustrated in FIG. 8, the FCoE controller 5 executes FLOGI processing (more specifically, determines whether or not login is allowed), and when the login is allowed, assigns a FCID to the end node 3. The FCoE controller 5 then transmits a FLOGI ACC packet to the switch SW1.

Figure 9:
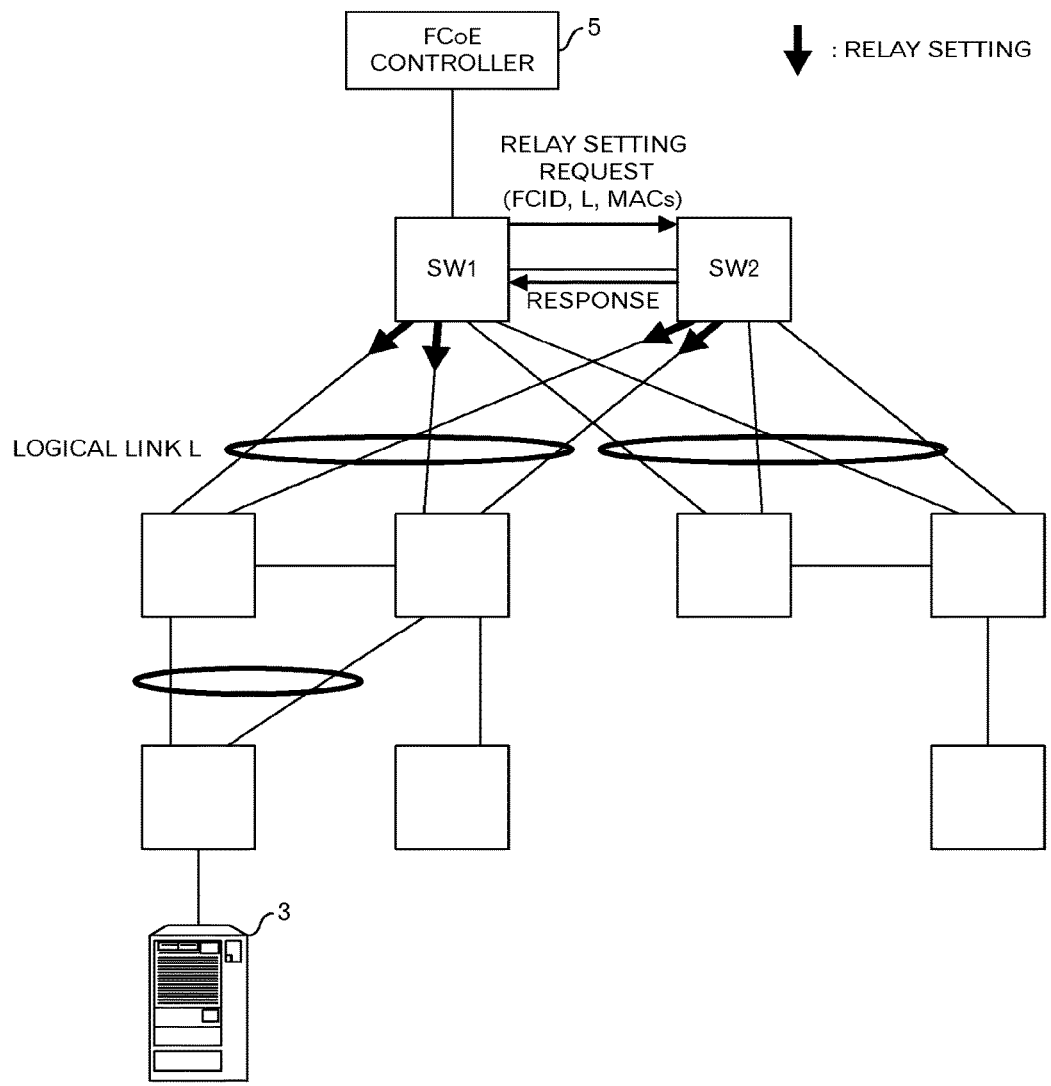
FIG. 9 is a diagram for explaining the outline of the processing performed in the first embodiment.

Then, as illustrated in FIG. 9, the switch SW1 that received the FLOGI ACC packet from the FCoE controller 5 makes settings for relaying a packet whose destination is the end node 3 for the switch SW1, and then transmits a relay setting request to the switch SW2 that belongs to the same domain (domain A). The relay setting request includes that the FCID that is assigned to the end node 3, the identifier of the logical link that received the FLOGI packet, and a MAC address of the end node 3. The switch SW2 that received the relay setting request makes settings for relaying a packet whose destination is the end node 3 based on the information included in the relay setting request, and transmits a response to the switch SW1. In FIG. 9, bold arrows represents that the relay settings have been made for the end node 3.

Figure 10:
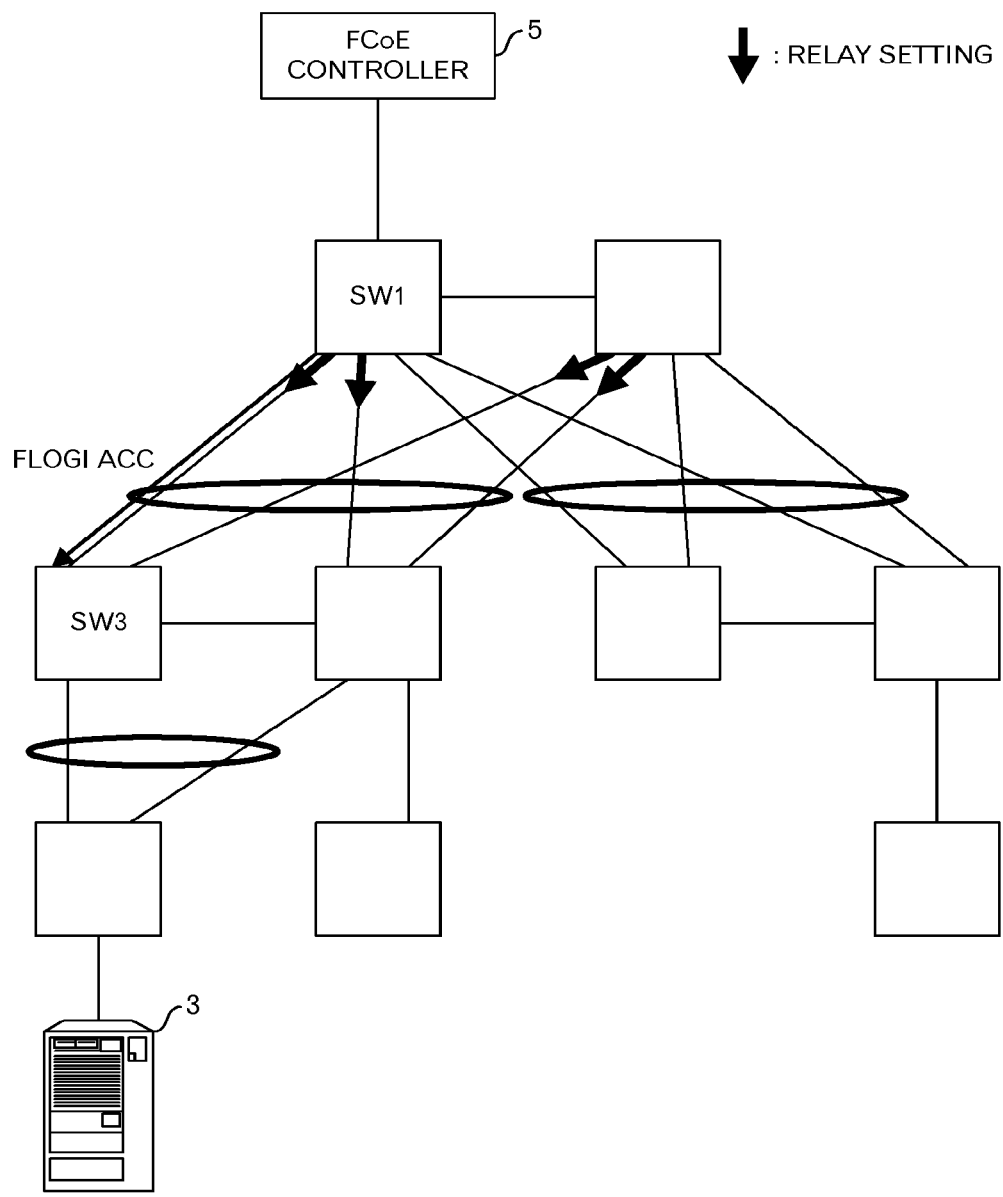
FIG. 10 is a diagram for explaining the outline of the processing performed in the first embodiment.

Then, as illustrated in FIG. 10, the switch SW1 that received the response from the switch SW2 transmits a FLOGI ACC packet to the switch SW3.

Figure 11:
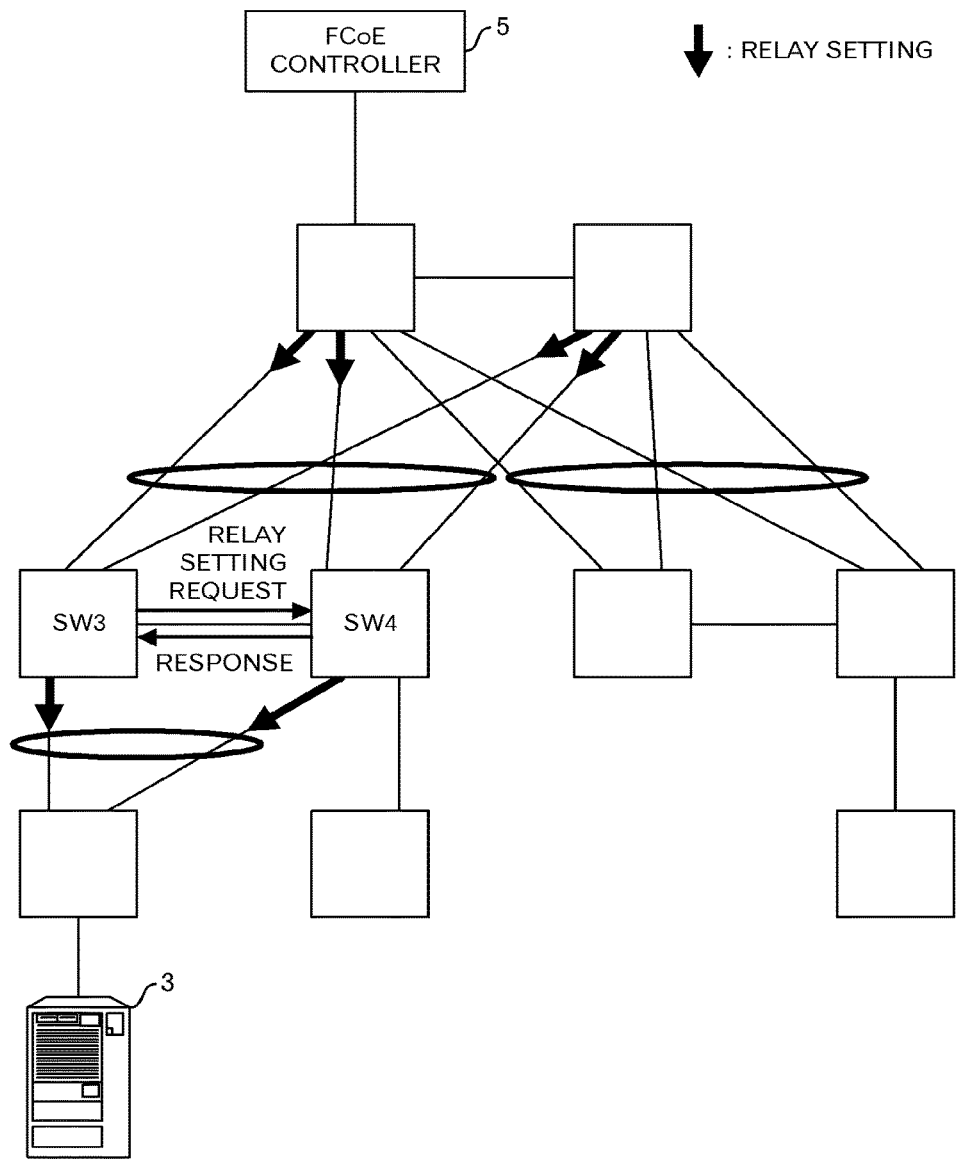
FIG. 11 is a diagram for explaining the outline of the processing performed in the first embodiment.

Next, as illustrated in FIG. 11, the switch SW3 that received the FLOGI ACC packet from the switch SW1 makes settings for relaying a packet whose destination is the end node 3, and then transmits a relay setting request to the switch SW4 that belongs to the same domain (domain B). The switch SW4 that received the relay setting request makes settings for relaying a packet whose destination is the end node 3 based on the information included in the relay setting request, and transmits a response to the switch SW3. At this point, making relay settings for the switch SW1, the switch SW2, the switch SW3 and the switch SW4 is complete.

Figure 12:
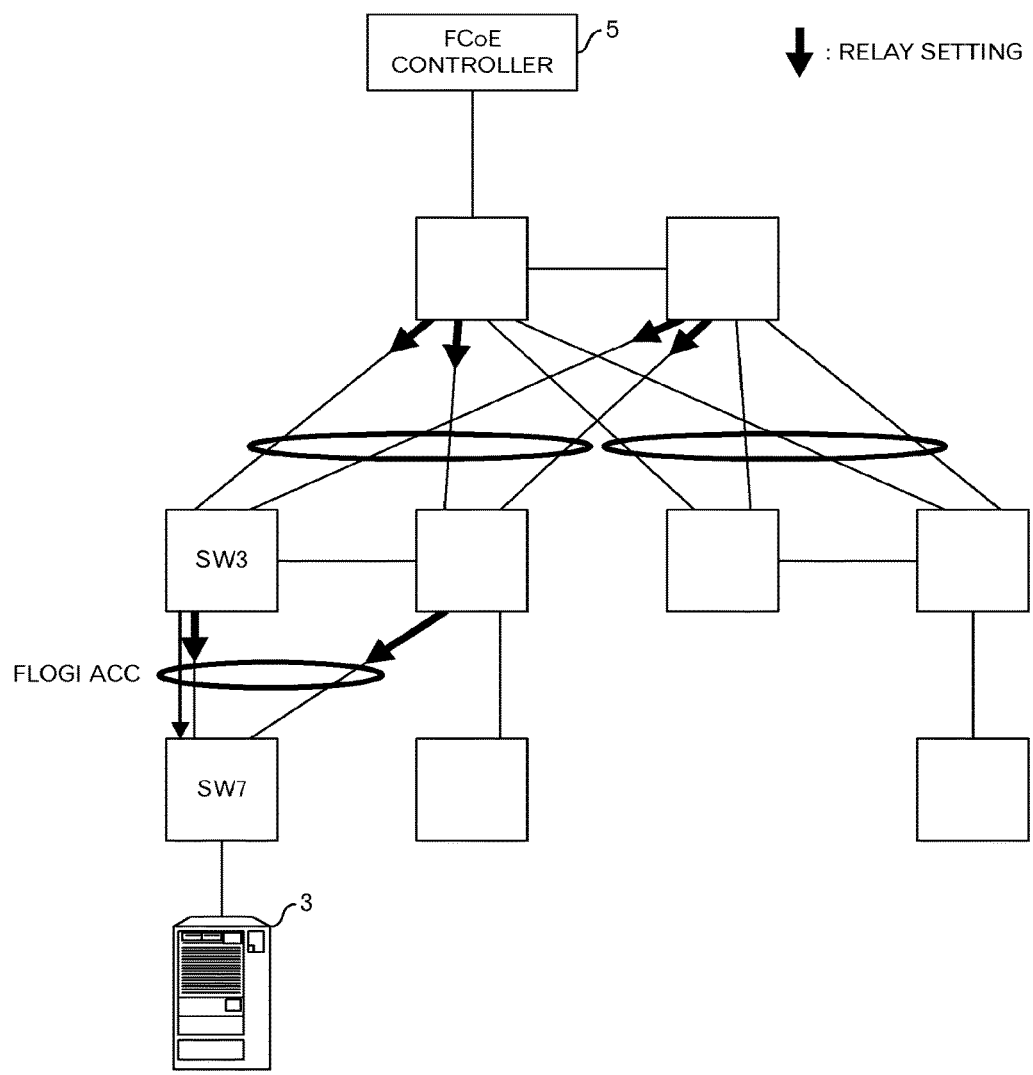
FIG. 12 is a diagram for explaining the outline of the processing performed in the first embodiment.

Then, as illustrated in FIG. 12, the switch SW3 that received the response from the switch SW4 transmits the FLOGI ACC packet to the switch SW7. Finally, the FLOGI ACC packet arrives at the end node 3.

Figure 13:
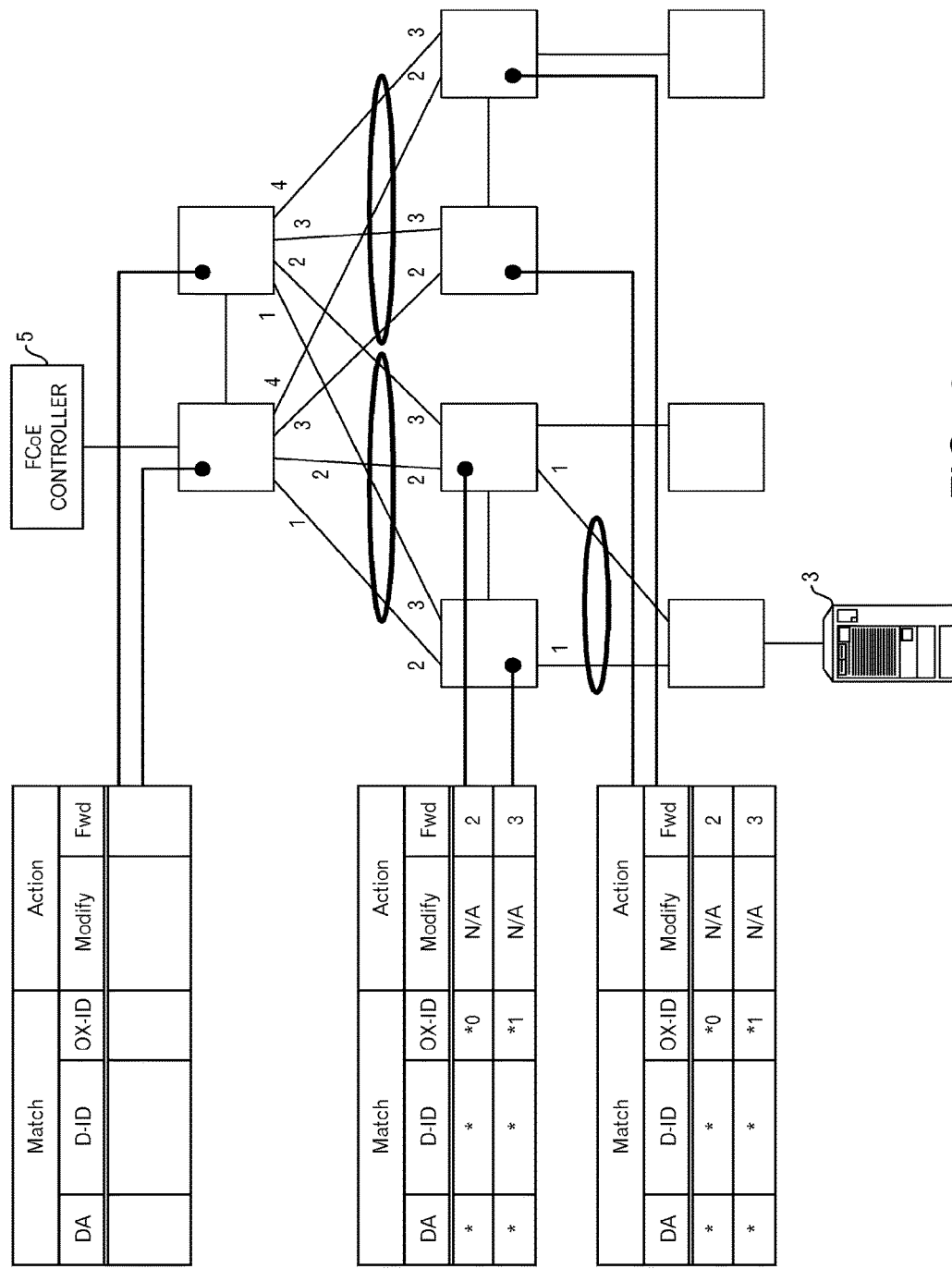
FIG. 13 is a diagram for explaining the outline of the processing performed in the first embodiment.
Figure 14:
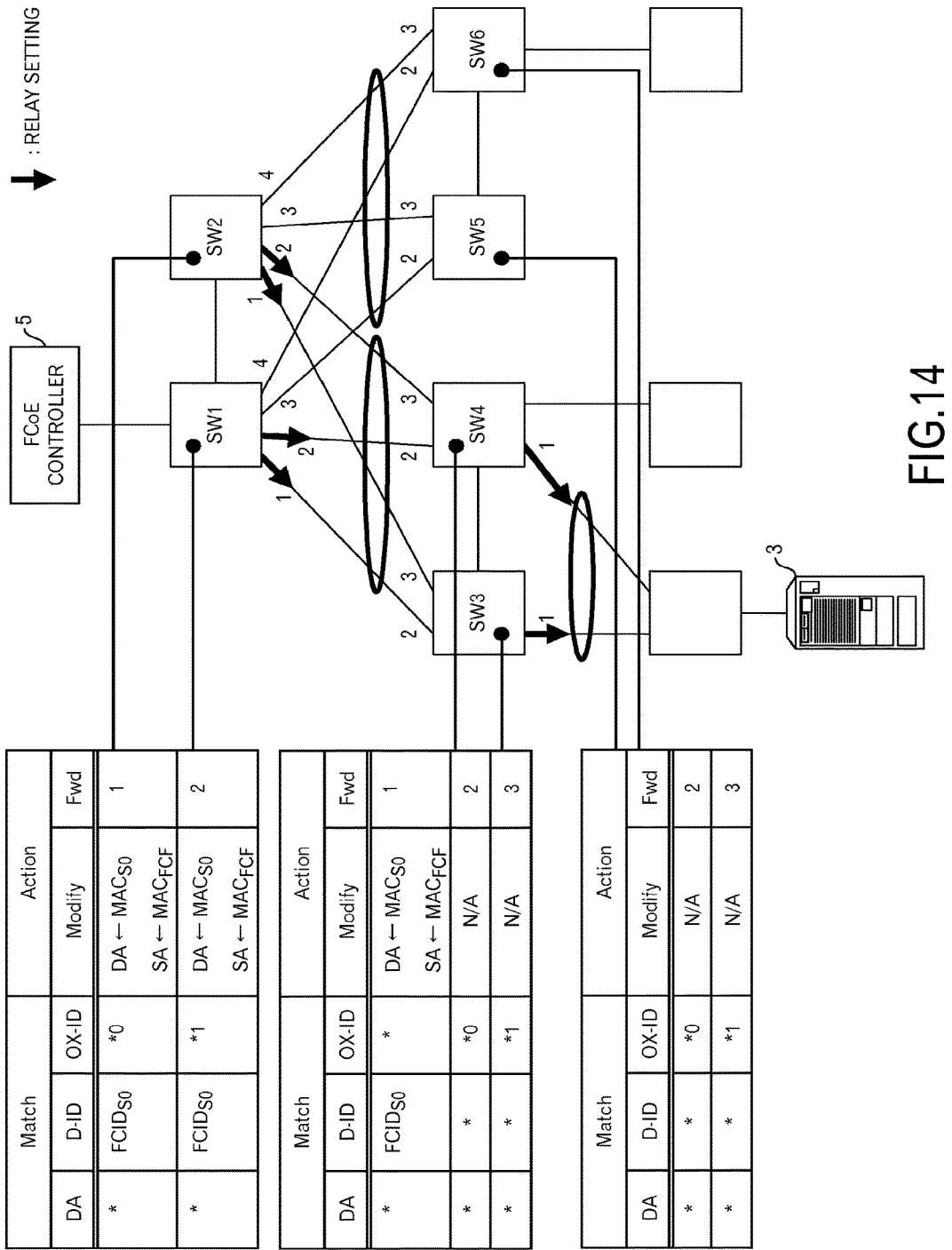
FIG. 14 is a diagram for explaining the outline of the processing performed in the first embodiment.

FIG. 13 illustrates an initial state of the FCoE relay table 15152 in the system. Here, the initial state of the FCoE relay table 15152 for the switch SW1, the switch SW2, the switch SW3, the switch SW4, the switch SW5 and the switch SW6 related to the explanation is illustrated. As was explained by using FIGS. 7 to 12, after the FLOGI packet and the FLOGI ACC packet are relayed, the state of the FCoE relay table 15152 in the system becomes as illustrated in FIG. 14. In FIG. 14, an entry for relaying a packet to the end node 3 is added to the FCoE relay table 15152 for the switch SW1, the switch SW2, the switch SW3 and the switch SW4. As was explained above, the MAC address $MAC_{S0}$ is assigned to the end node 3, and the MAC address $MAC_{FCF}$ is assigned to the FCoE controller 5.

Figure 15:
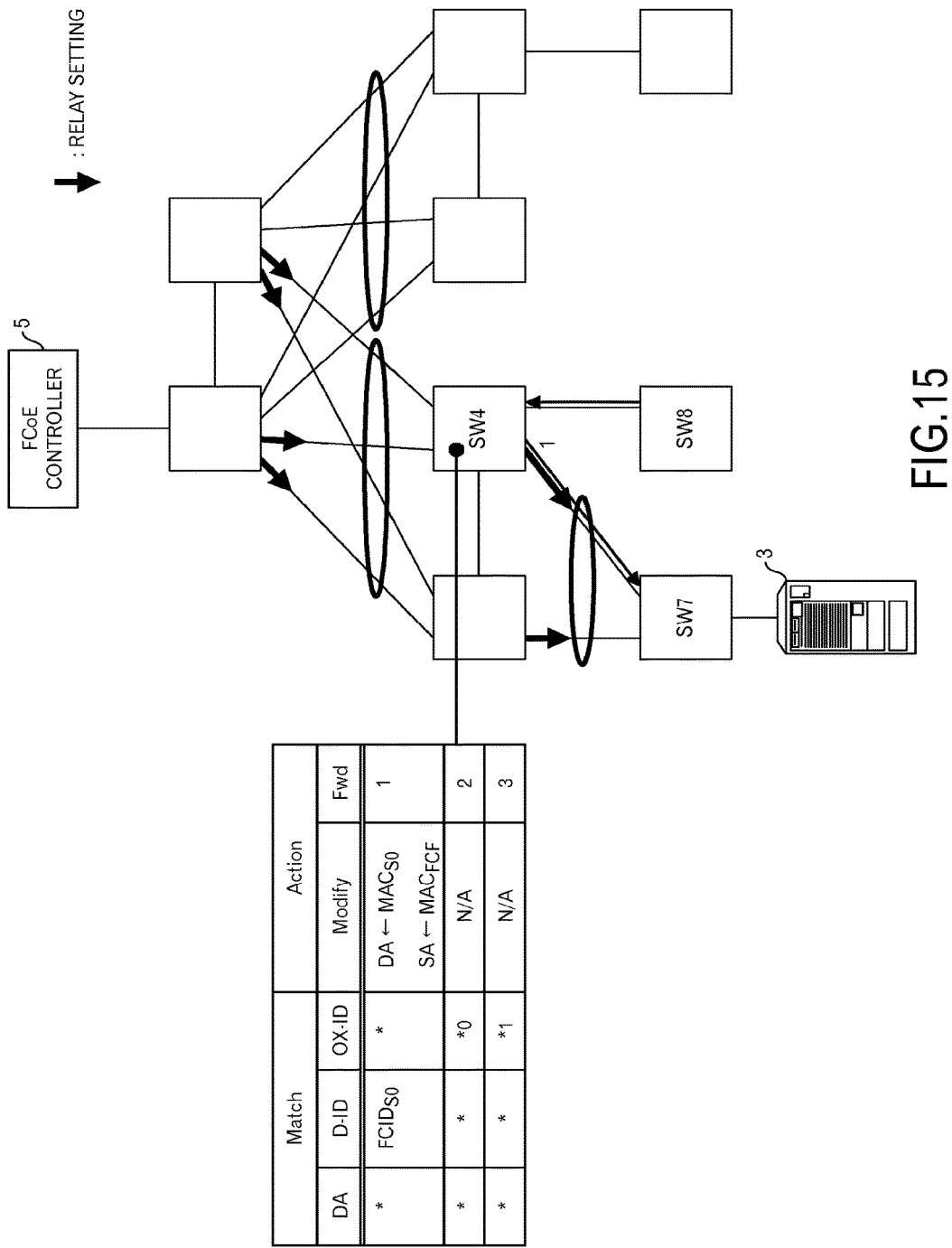
FIG. 15 is a diagram for explaining the outline of the processing performed in the first embodiment.

For example, as illustrated in FIG. 15, assume that the switch SW8 transmitted a packet whose destination is the end node 3. The switch SW4 that received the packet from the switch SW8 compares a header of the packet with conditions specified in the Match column in the FCoE relay table 15152 in the order of priority, and identifies a condition of a first match (here, this is a condition on a first line). Then, the switch SW4 modifies the header of the packet according to information that is specified in the Action column of the FCoE relay table 15152 (more specifically, converts a transmission source MAC address and a destination MAC address), and outputs the packet. The switch SW7 receives the packet that was transmitted by the switch SW4 and relays the packet to the end node 3.

Figure 16:
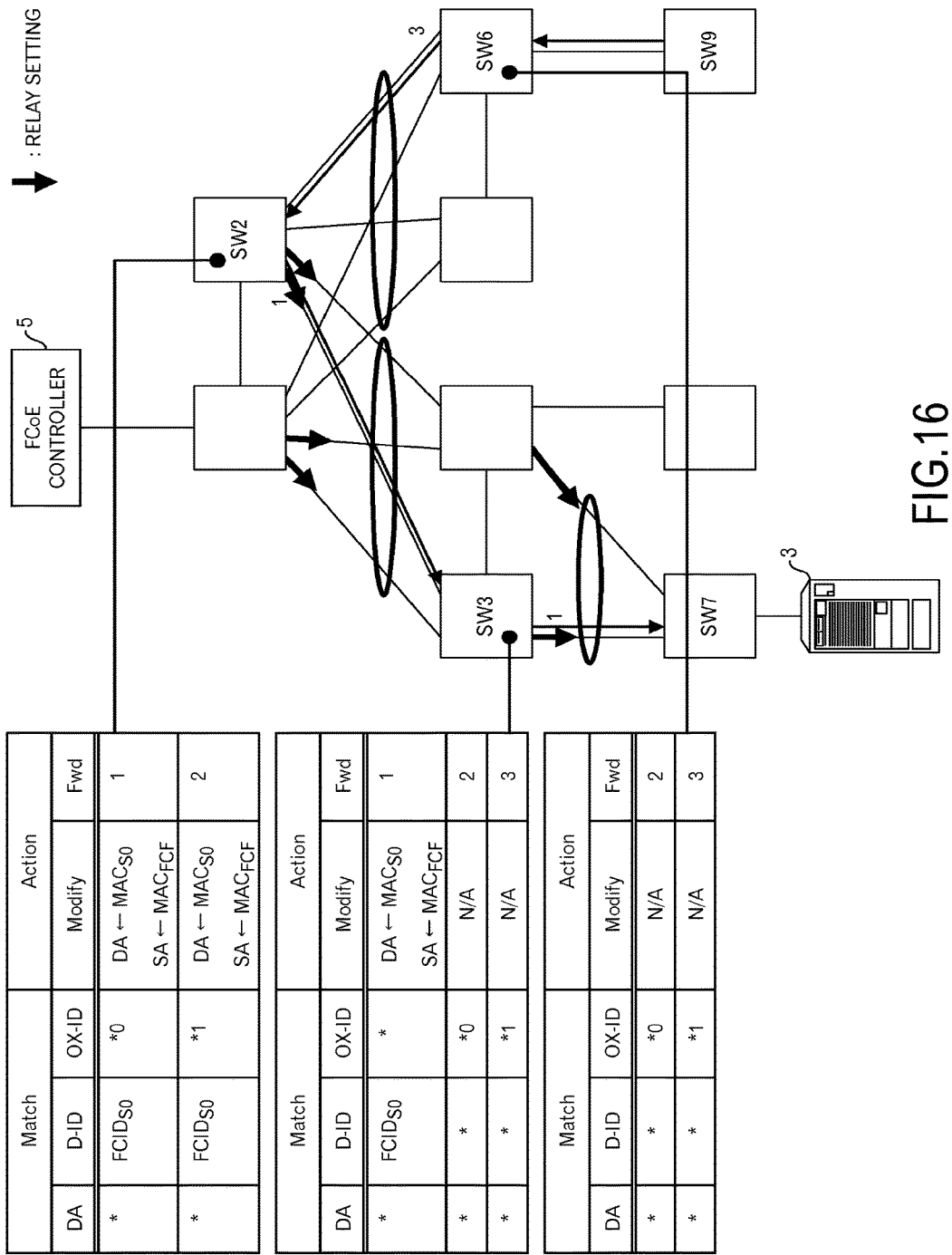
FIG. 16 is a diagram for explaining the outline of the processing performed in the first embodiment.

Moreover, as illustrated in FIG. 16, assume that the switch SW9 transmitted a packet whose destination is the end node 3. The switch SW6 that received the packet from the switch SW9 compares a header of the packet with the conditions specified in the Match column of the FCoE relay table 15152 in the order of priority, and identifies a condition of a first match (here, this is a condition in a second line). Then, the switch SW6 outputs the packet according to information that is specified in the Action column of the FCoE relay table 15152. The switch SW2 that received the packet from the switch SW6 compares the header of the packet with the conditions specified in the Match column of the FCoE relay table 15152 in the order of priority, and identifies a condition of a first match (here, this is a condition in a first line). Then, the switch SW2 modifies the header of the packet according to information that is specified in the Action column of the FCoE relay table 15152 (more specifically, converts a transmission-source MAC address and a destination MAC address), and outputs the packet. The switch SW3 that received the packet from the switch SW2 compares the header of the packet with the conditions specified in the Match column of the FCoE relay table 15152 in the order of priority, and identifies a condition of a first match (here, this is a condition in a first line). Then, the switch SW3 outputs the packet according to information that is specified in the Action column of the FCoE relay table 15152. The switch SW7 receives the packet that was transmitted from the switch SW3, and relays the packet to the end node 3.

Figure 17:
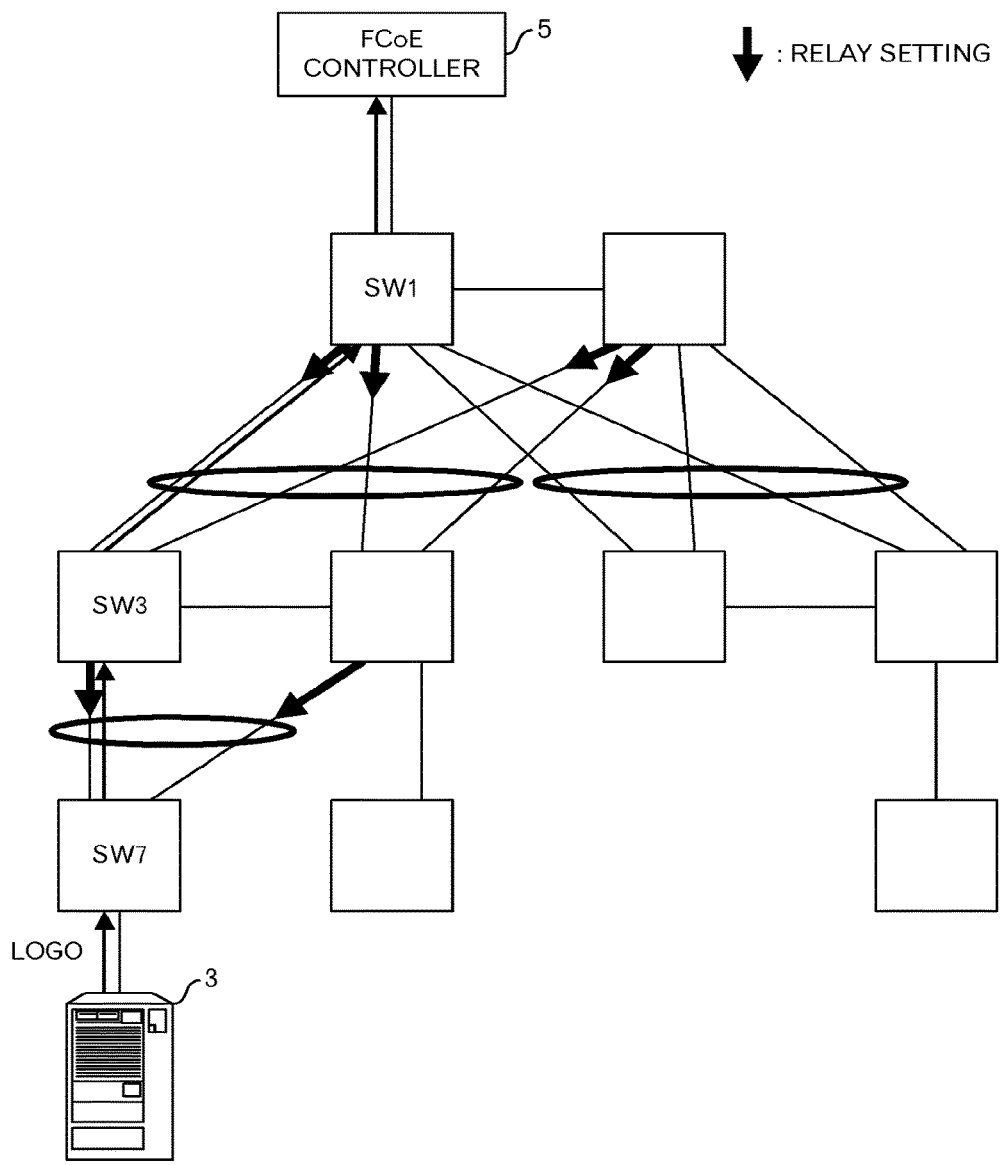
FIG. 17 is a diagram for explaining the outline of the processing performed in the first embodiment.

Moreover, as illustrated in FIG. 17, assume that the end node 3 outputted a LOGO packet. The switch SW7 that received the LOGO packet from the end node 3 relays the LOGO packet to the switch SW3. The switch SW3 that received the LOGO packet from the switch SW7 relays the LOGO packet to the switch SW1. The switch SW1 that received the LOGO packet from the switch SW3 relays the LOGO packet to the FCoE controller 5.

Figure 18:
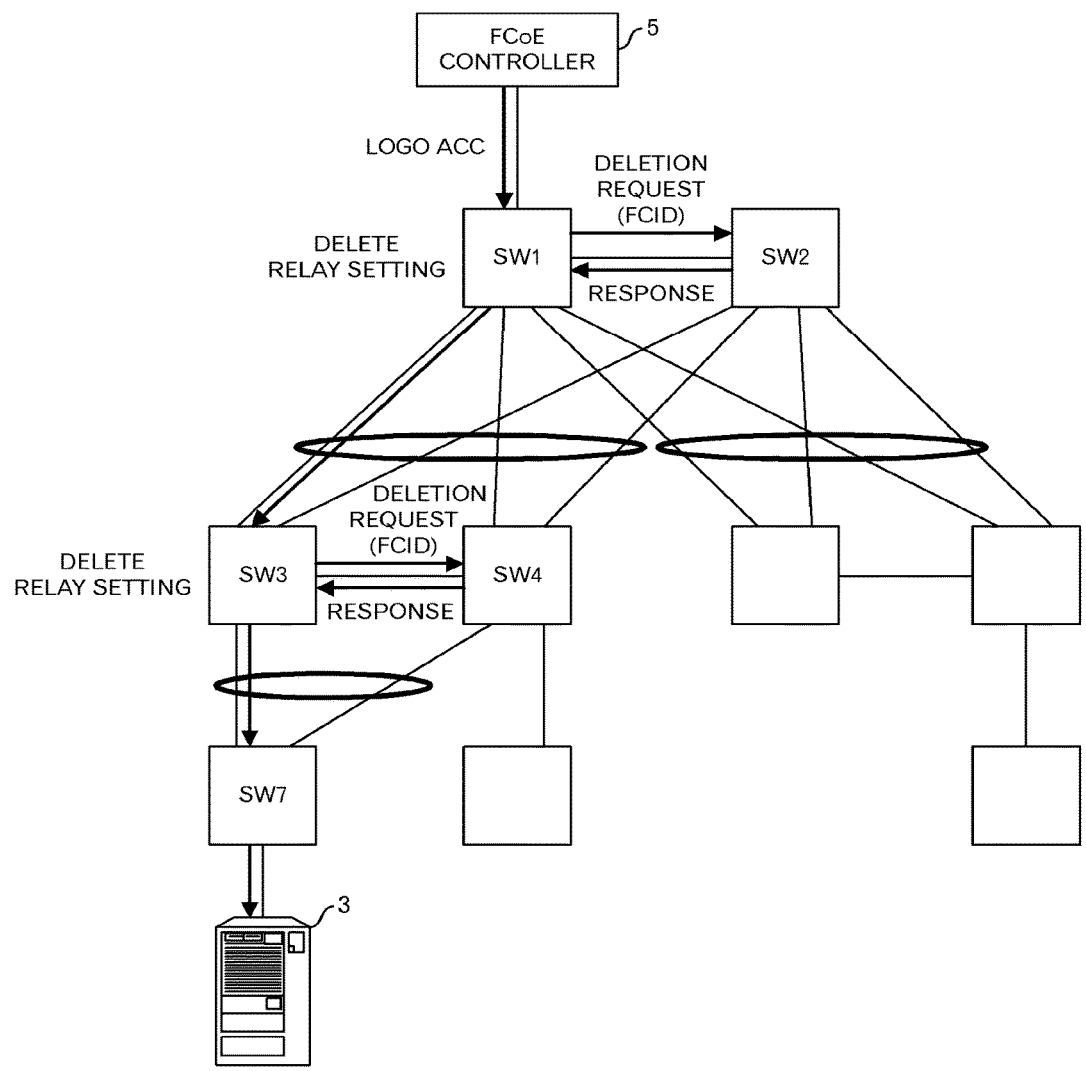
FIG. 18 is a diagram for explaining the outline of the processing performed in the first embodiment.

Then, the FCoE controller 5 executes LOGO processing (more specifically, determines whether or not logout is allowed). When logout is allowed, as illustrated in FIG. 18, the FCoE controller 5 transmits a LOGO ACC packet to the switch SW1. The switch SW1 that received the LOGO ACC packet from the FCoE controller 5 deletes the settings for relaying the packet whose destination is the end node 3, and transmits a deletion request to the switch SW2 that belongs to the same domain (domain A). The deletion request includes the FCID that is assigned to the end node 3. The switch SW2 that received the deletion request deletes the settings for relaying the packet whose destination is the end node 3, and transmits a response to the switch SW1. The switch SW1 that received the response from the switch SW2 then transmits the LOGO ACC packet to the switch SW3.

Then, the switch SW3 that received the LOGO ACC packet from the switch SW1 deletes the settings for relaying the packet whose destination is the end node 3, and transmits a deletion request to the switch SW4 that belongs to the same domain (domain B). The switch SW4 that received the deletion request deletes, based on information that is included in the deletion request, the settings for relaying the packet whose destination is the end node 3, and transmits a response to the switch SW3. At this time, the settings for the relay have been deleted for the switch SW1, the switch SW2, the switch SW3 and the switch SW4. Then, the switch SW3 that received the response from the switch SW4 transmits the LOGO ACC packet to the switch SW7, and the switch SW7 that received the LOGO ACC packet from the switch SW3 transmits the LOGO ACC packet to the end node 3.

Figure 19:
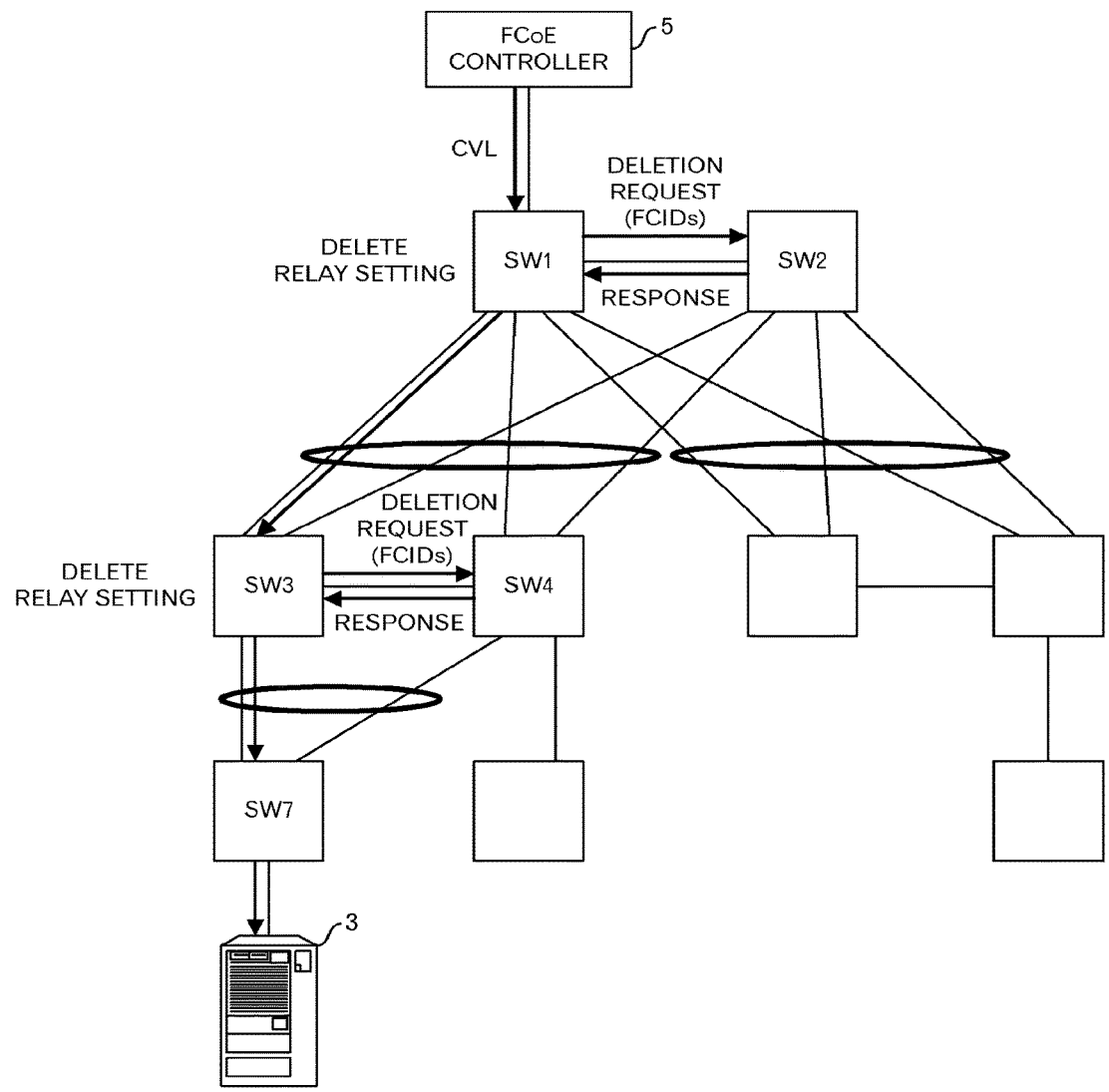
FIG. 19 is a diagram for explaining the outline of the processing performed in the first embodiment.

The processing that is performed when the FCoE controller 5 outputs a CVL packet is the same as that for a LOGO ACC packet as illustrated in FIG. 19.

Next, processing that is performed in the first embodiment will be explained in detail by using FIG. 20 to FIG. 31. First, the initial setting processing that is executed when activating the switches will be explained by using FIG. 20.

Figure 20:
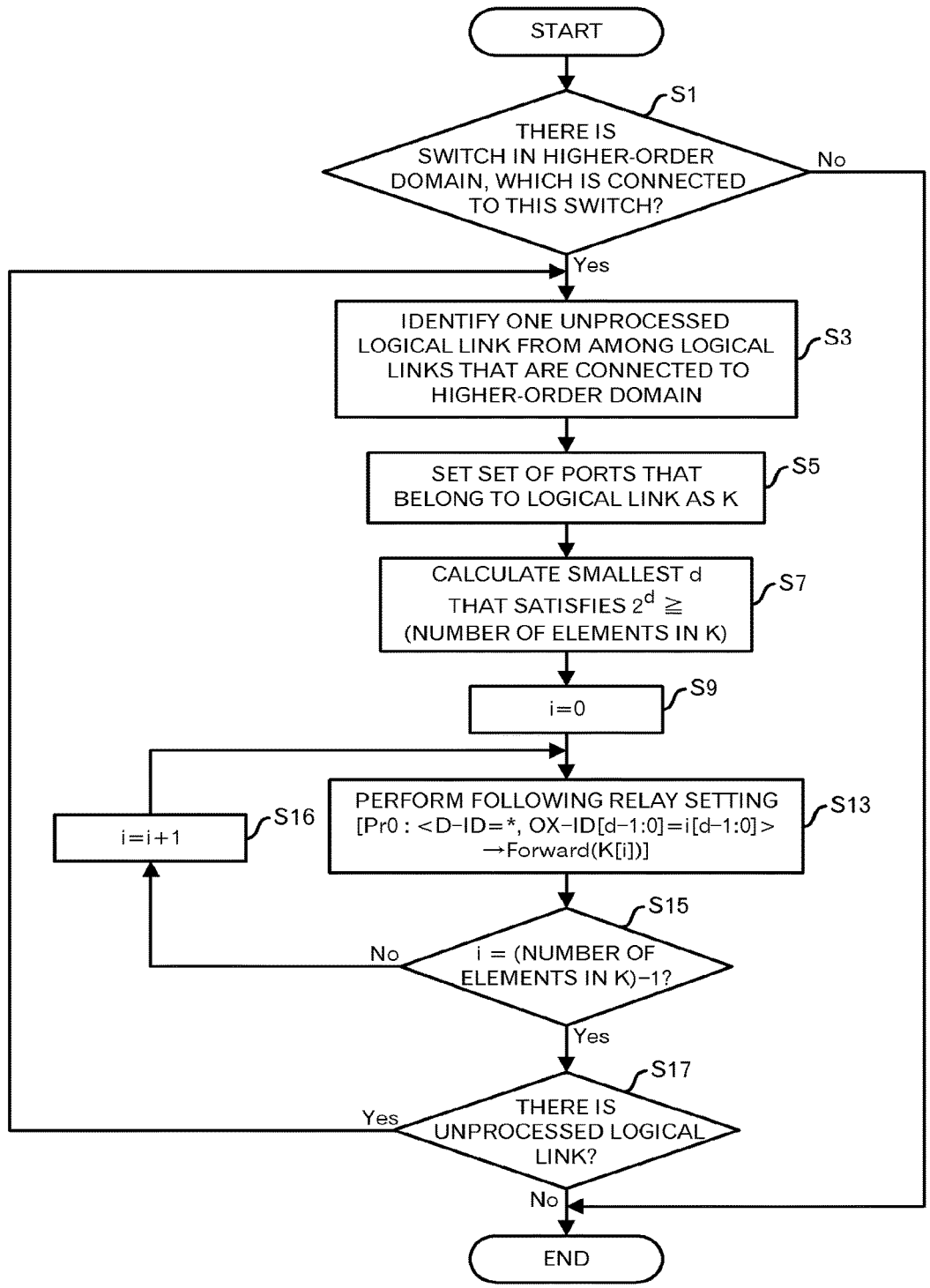
FIG. 20 is a diagram depicting a processing flow of initial setting processing.

The initial setting unit 1521 determines whether there is a switch in a higher-order domain, which is connected to this switch (switch for which process is being performed, this will be the same from hereon) (FIG. 20: step S1). In this embodiment, "higher-order" means that the domain is closer to the FCoE controller 5. In the case of the example in FIG. 2, the domain A is a higher-order domain of the domain B and the domain C.

When there is no switch in a higher-order domain (step S1: No route), the processing ends. On the other hand, when there is a switch of in a higher-order domain (step S1. Yes route), the initial setting unit 1521 identifies one unprocessed logical link of the logical links to be connected to the higher-order domain (step S3).

The initial setting unit 1521 identifies a set of ports that belong to the logical link that was specified in the step S3, and sets the set as a set K (step S5).

The initial setting unit 1521 calculates the smallest integer d that satisfies $2^d \geq$ (The number of elements in the set K) (step S7). Here, d is a variable that represents the number of digits of OX-ID (in this embodiment, this is expressed in binary).

The initial setting unit 1521 sets i=0, where i is a variable for calculating the number of port (in this embodiment, this is expressed in binary) (step S9).

The initial setting unit 1521 makes the following relay settings in the FCoE relay table 15152 (step S13). More specifically, with priority "0" (Pr0), information on processing for outputting a received packet to the ith port in the set K when the D-ID of the received packet is * and when digits of OX-ID from the lowest order (0th) to the (d−1)th matches digits of i from the lowest order (0th) to the (d−1)th (D-ID=*, OX-ID[d−1:0]=i[d−1:0]) is set as the relay information. When the information is listed in the format Pr<Priority>:<Comparison Condition>→Processing, the information is expressed as Pr0:<D-ID=OX-ID[d−1:0]=i[d−1:0]>→Forward(K[i]). However, when d=0, no comparison condition is set for comparing OX-ID and i.

The initial setting unit 1521 determines whether i=(the number of elements in the set K)−1 holds (step S15). When i=(the number of elements in the set K)−1 does not hold (step S15: No route), the initial setting unit 1521 increments i by 1 (step S16), and then the processing returns to the step S13.

On the other hand, when i=(the number of elements in the set K)−1 holds (step S15: Yes route), the initial setting unit 1521 determines whether there is an unprocessed logical link (step S17). When there is an unprocessed logical link (step S17: Yes route), the processing returns to step S3. When there are no unprocessed logical links (step S17: No route), the processing ends.

The initial setting processing such as described above is executed for each switch in the system. As a result, the state of the FCoE relay table 15152 of the system becomes as illustrated in FIG. 13. The usage of the ports is determined according to the OX-ID, so traffic becomes dispersed.

Figure 21:
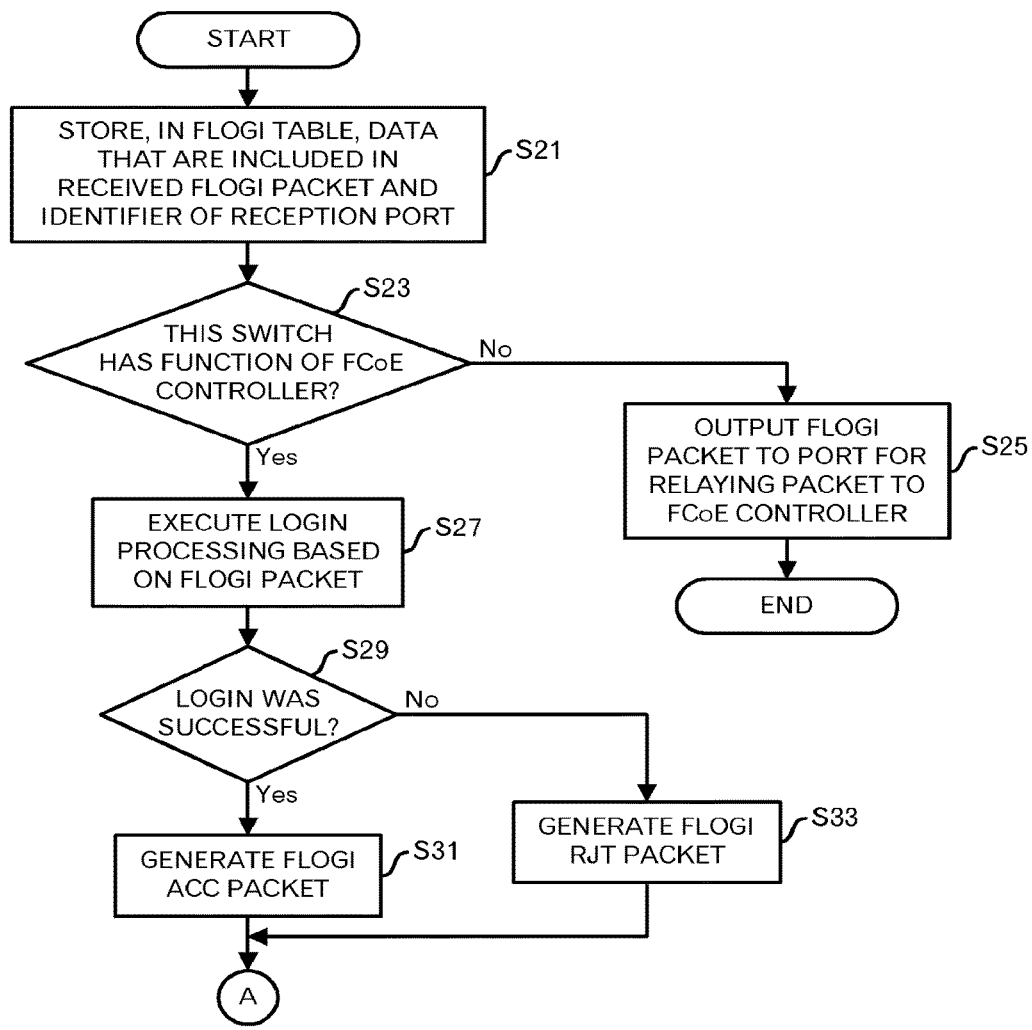
FIG. 21 is a diagram depicting a processing flow of processing executed by a switch that received a FLOGI packet or a FDISC packet.

Next, processing that is executed by the switches that receive a FLOGI packet and FDISC packet will be explained by using FIGS. 21 to 23. The processing that is executed by a switch that receives a FDISC packet is the same as the processing that is executed by a switch that receives a FLOGI packet, so here an example of a FLOGI packet will be explained.

First, the FLOGI packet that was received by the switch is outputted to the protocol processing unit 152 by way of the inner port B. Then the first FIP processing unit 1522 in the protocol processing unit 152 stores data (more specifically, a transmission source MAC address, and a transmission source WWPN) included in the received FLOGI packet and an identifier of a reception port in the FLOGI table 153 (step S21). At the time of this processing, a FPMA and a FCID are not stored.

The first FIP processing unit 1522 determines whether this switch has a function of an FCoE controller (in other word, whether the switch is the FCoE controller 5) (step S23).

When this switch does not have a function of an FCoE controller (step S23: No route), the first FIP processing unit 1522 outputs the FLOGI packet to a port for relaying the packet to the FCoE controller 5 (step S25). More specifically, the first FIP processing unit 1522 outputs a port selection instruction to the demultiplexer 1514. The processing then ends.

On the other hand, when this switch has a function of an FCoE controller (step S23: Yes route), the first FIP processing unit 1522 executes login processing based on the FLOGI packet (step S27). The login processing is processing for determining whether a FCID can be assigned to the transmission source of the FLOGI packet.

The first FIP processing unit 1522 determines whether login was successful (in other word, whether a FCID can be assigned to the transmission source of the FLOGI packet) (step S29). When login was not successful (step S29: No route), the first FIP processing unit 1522 generates a FLOGI RJT packet (step S33). On the other hand, when login was successful (step S29: Yes route), the first FIP processing unit 1522 generates a FLOGI ACC packet (step S31). The processing then shifts to step S35 in FIG. 22 by way of a terminal A.

Figure 22:
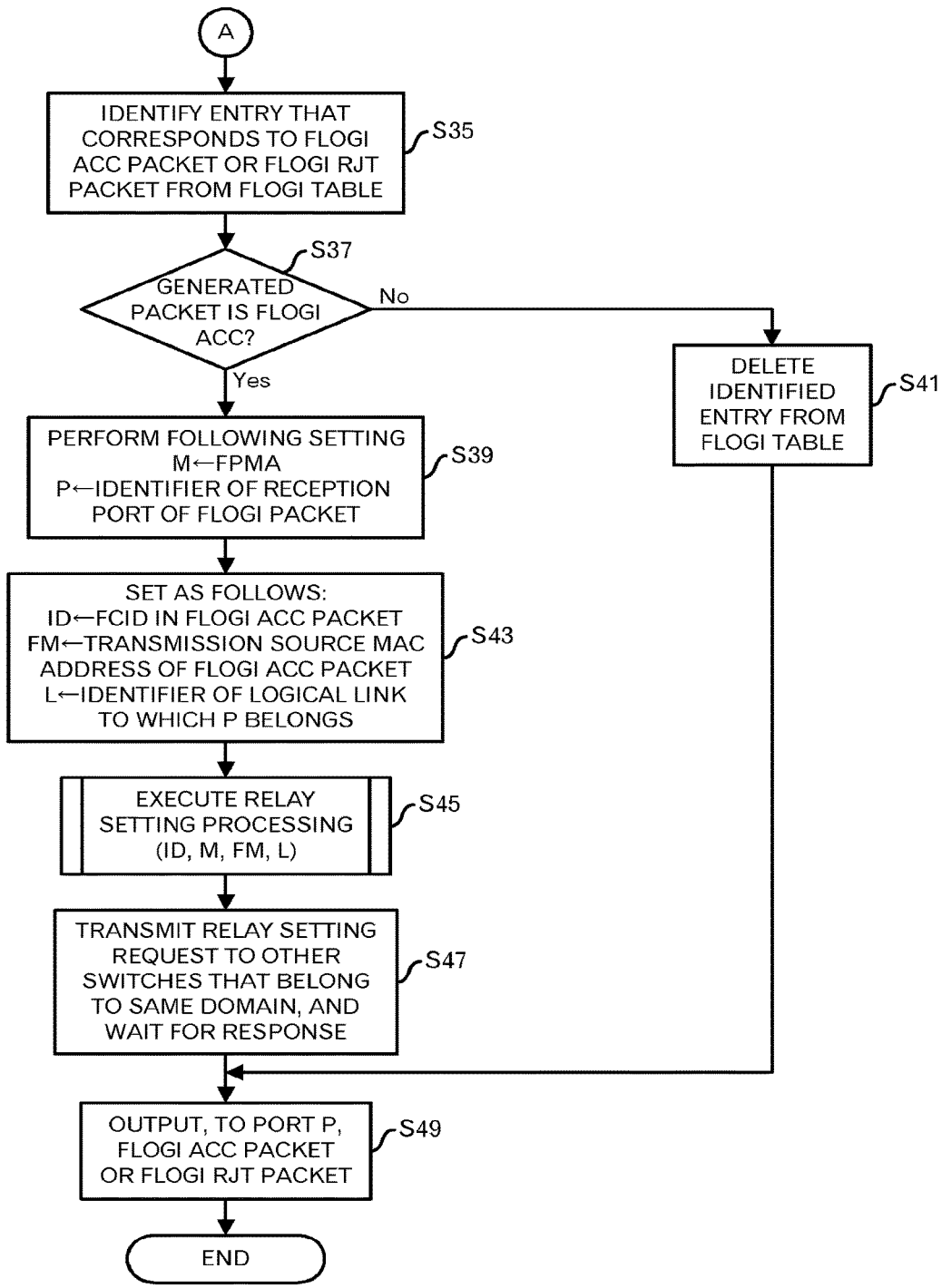
FIG. 22 is a diagram depicting the processing flow of the processing executed by the switch that received the FLOGI packet or the FDISC packet.

Shifting to an explanation of FIG. 22, the first FIP processing unit 1522 identifies, from the FLOGI table 153, an entry that corresponds to the FLOGI ACC packet that was generated in the step S31 or the FLOGI RJT packet that was generated in the step S33 (step S35). The entry identified in the step S35 includes the transmission source MAC address of the FLOGI packet, and the identifier of the reception port of the FLOGI packet.

The first FIP processing unit 1522 determines whether the generated packet is a FLOGI ACC packet (step S37). In the case that the processing passed through the step S31, the generated packet is a FLOGI ACC packet. When the generated packet is not a FLOGI ACC packet (step S37: No route), the generated packet is a FLOGI RJT packet. Therefore, the first FIP processing unit 1522 deletes the entry identified in the step S35 from the FLOGI table 153 (step S41). The processing then shifts to step S49.

On the other hand, when the generated packet is a FLOGI ACC packet (step S37: Yes route), the first FIP processing unit 1522 sets the FPMA for a variable M that represents the destination MAC address, and sets the identifier of the reception port of the FLOGI packet for a variable P that represents the identifier of the reception port (step S39).

The first FIP processing unit 1522 makes the following settings (step S43). More specifically, the first FIP processing unit 1522 sets the FCID that is included in the FLOGI ACC packet for a variable ID that represents the FCID, sets the transmission source MAC address of the FLOGI ACC packet for a variable FM that represents the transmission source MAC address, and sets the identifier of the logical link to which a port P belongs for a variable L that represents the logical link that is used.

The first FIP processing unit 1522 outputs the variable ID, the variable M, the variable FM and the variable L to the relay setting unit 1523. Accordingly, the relay setting unit 1523 executes the relay setting processing by using the variable ID, the variable M, the variable FM and the variable L as arguments (step S45). The relay setting processing will be explained by using FIG. 23.

Figure 23:
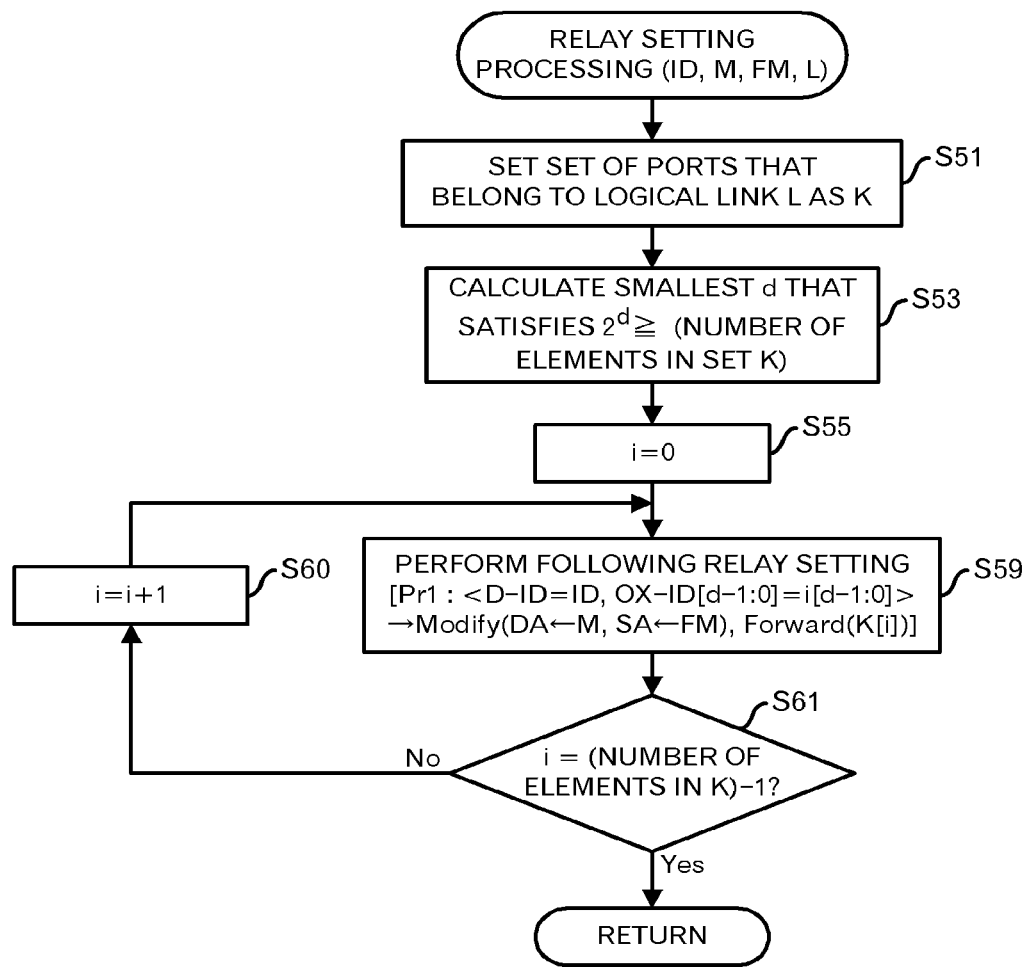
FIG. 23 is a diagram depicting a processing flow of relay setting processing.

First, the relay setting unit 1523 identifies a set of ports that belong to a logical link L, and sets that set as set K (FIG. 23: step S51). The relay setting unit 1523 calculates the smallest integer d that satisfies $2^d \geq$ (the number of elements in the set K) (step S53). Here, d is a variable that represents the number of digits of OX-ID (is represented in binary in this embodiment).

The relay setting unit 1523 sets i=0 for the variable i for counting the number ports (i is represented in binary in this embodiment) (step S55).

The relay setting unit 1523 makes the following relay settings in the FCoE relay table 15152 (step S59). More specifically, with priority "1" (Pr1), information on processing for modifying a DA of the received packet to the M, modifying a SA of the received packet to the FM, and outputting a received packet to the ith port in the set K when the D-ID of the received packet corresponds to the variable ID and digits of OX-ID from the lowest order (0th) to the (d−1)th matches digits of i from the lowest order (0th) to the (d−1)th (D-ID=ID, OX-ID[d−1:0]=i[d−1:0]) is set as the relay information (step S59). When described in the format Pr<Priority>:<Comparison condition>→Processing, this is represented as Pr1: <D-ID=ID, OX-ID[d−1:0]=i[d−1:0]>→Modify(DA←M, SA←FM), Forward(K[i]).

The relay setting unit 1523 determines whether i=(the number of elements in the set K)−1 holds (step S61). When i=(the number of elements in the set K)−1 does not hold (step S61: No route), the relay setting unit 1523 increments i by 1 (step S60), and the processing returns to step S59.

On the other hand, when i=(the number of elements in the set K)−1 holds (step S61: Yes route), the processing returns to the calling source.

By executing processing such as described above, it becomes possible to store, in the FCoE relay table 15152, an entry for relaying the packet whose destination is a transmission source node of a FLOGI packet.

Returning to the explanation of FIG. 22, the first FIP processing unit 1522 transmits a relay setting request to other switches that belong to the same domain as this switch, and waits for a response from the transmission destination switch (step S47). The relay setting request includes at least the variable ID, the variable M, the variable FM and the variable L. Processing by the switch that received the relay setting request will be explained later.

After receiving the response, the first FIP processing unit 1522 instructs the switch LSI 151 to output the FLOGI ACC packet that was generated in the step S31 or the FLOGI RJT packet that was generated in the step S33 to the port P (step S49). The processing then ends.

By executing processing such as described above, it becomes possible to execute relay setting at each switch. Therefore, it becomes possible to prevent a concentrated load at a specific device on a network.

Figure 24:
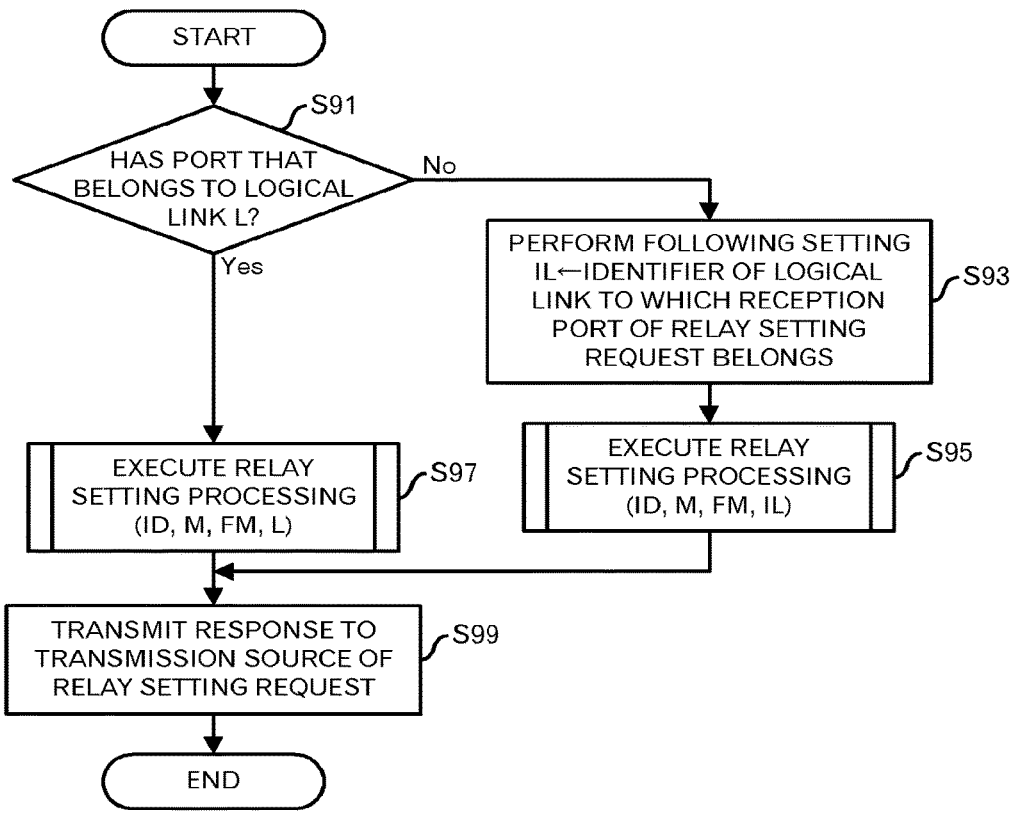
FIG. 24 is a diagram depicting a processing flow of processing executed by a switch that received a relay setting request.

Here, the processing that is executed by a switch that received the relay setting request will be explained using FIG. 24.

First, the relay setting request that was received by a switch (hereinafter, referred to as this switch) is outputted to the protocol processing unit 152 by way of the inner port B. Then, the first FIP processing unit 1522 in the protocol processing unit 152 determines whether this switch has a port that belongs to the logical link L (FIG. 24: step S91). An identifier of the logical link L is included in the relay setting request.

When the switch does not have a port that belongs to the logical link L (step S91: No route), the first FIP processing unit 1522 sets the identifier of the logical link to which the reception port of the relay setting request belongs for a variable IL that represents the logical link used (step S93). Then, the first FIP processing unit 1522 outputs the variable ID, the variable M, the variable FM and the variable IL to the relay setting unit 1523. Accordingly, the relay setting unit 1523 executes the relays setting processing by using the variable ID, the variable M, the variable FM and the variable IL as arguments (step S95). The relay setting processing is as explained by using FIG. 23, and the explanation here is omitted. The processing then shifts to step S99.

On the other hand, when the switch has a port that belongs to the logical link L (step S91: Yes route), the first FIP processing unit 1522 outputs the variable ID, the variable M, the variable FM and the variable L to the relay setting unit 1523. Accordingly, the relay setting unit 1523 executes the relay setting processing by using the variable ID, the variable M, the variable FM and the variable L as arguments (step S97). The relay setting processing is as explained by using FIG. 23, and the explanation here is omitted.

The first FIP processing unit 1522 generates a response that represents that the relay setting has finished, and transmits the response to the transmission source of the relay setting request (step S99). The processing then ends.

By executing processing such as described above, it becomes possible to perform suitable communication based on settings for switches that belong to the same domain as a switch that generated the FLOGI ACC packet.

Figure 25:
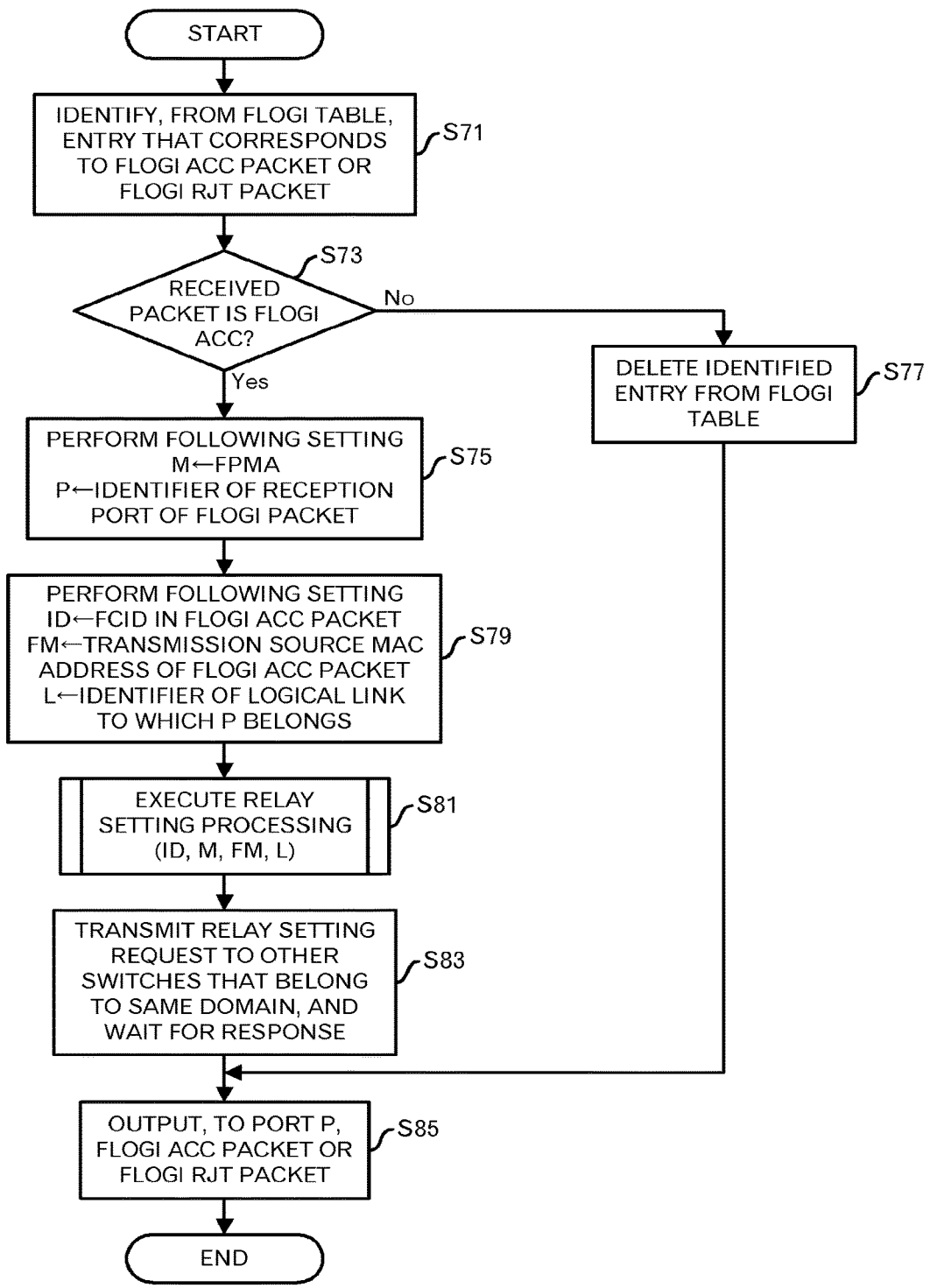
FIG. 25 is a diagram depicting a processing flow of processing executed by a switch that received a FLOGI ACC packet or a FLOGI RJT packet.

Processing that is executed by the switch that received the FLOGI ACC packet or FLOGI RJT packet is as illustrated in FIG. 25. As illustrated in FIG. 25, this processing is the same as the processing of steps S35 to S49. Therefore, the explanation will be omitted here.

Figure 26:
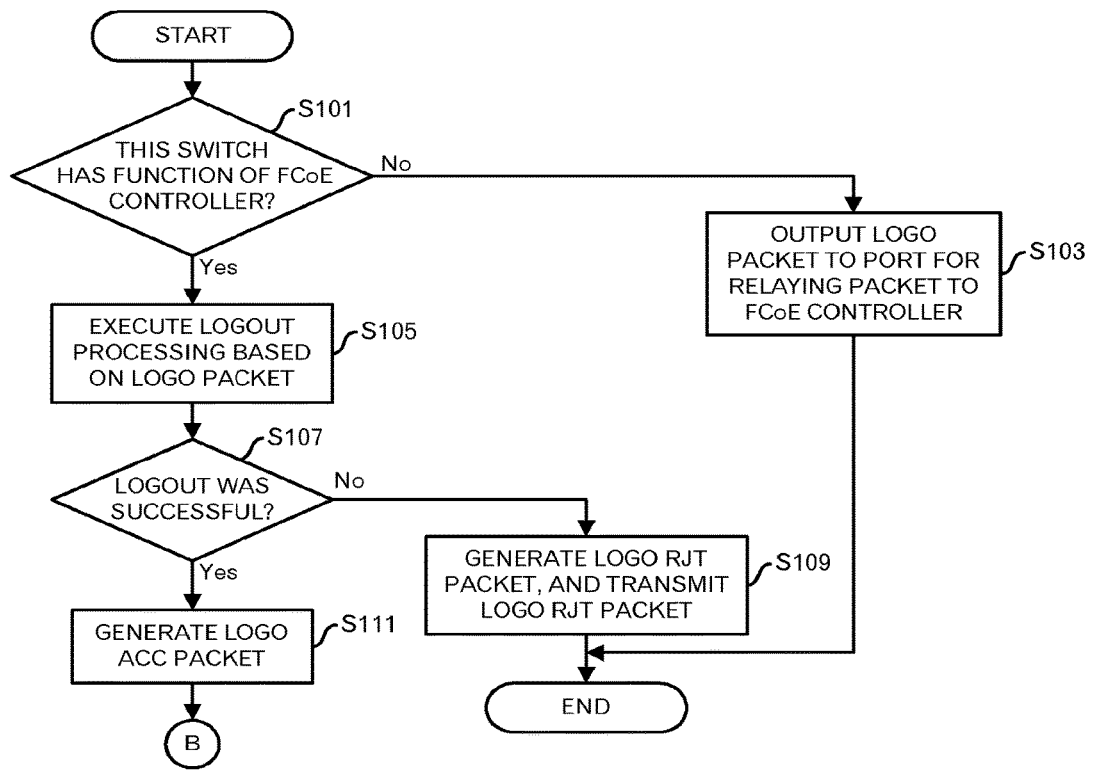
FIG. 26 is a diagram depicting a processing flow of processing executed by a switch that received a LOGO packet.

Next, processing that is executed by a switch that received a LOGO packet will be explained by using FIGS. 26 to 28.

First, a LOGO packet that was received by a switch (hereinafter, referred to as this switch) is outputted to the protocol processing unit 152 by way of the inner port B. Then, the second FIP processing unit 1524 in the protocol processing unit 152 determines whether this switch has a function of an FCoE controller (in other words, whether this switch is the FCoE controller 5) (FIG. 26: step S101).

When this switch does not have a function of an FCoE controller (step S101: No route), the second FIP processing unit 1524 outputs a LOGO packet to a port for relaying a packet to the FCoE controller 5 (step S103). The processing then ends.

On the other hand, when this switch has a function of an FCoE controller (step S101: Yes route), the second FIP processing unit 1524 executes logout processing based on the LOGO packet (step S105). The logout processing is processing that determines whether it is possible to terminate the assignment of the FCID to the transmission source of the LOGO Packet.

The second FIP processing unit 1524 determines whether logout was successful (in other words, whether it is possible to terminate the assignment of the FCID to the transmission source of the LOGO packet) (step S107). When logout was not successful (step S107: No route), the second FIP processing unit 1524 generates a LOGO RJT packet, and transmits the LOGO RJT packet (step S109). The processing then ends. The LOGO RJT packet is relayed in the same way as a normal packet, so a detailed explanation is omitted here.

On the other hand, when logout was successful (step S107: Yes route), the second FIP processing unit 1524 generates a LOGO ACC packet (step S111). The processing then shifts to step S113 in FIG. 27 by way of a terminal B.

Figure 27:
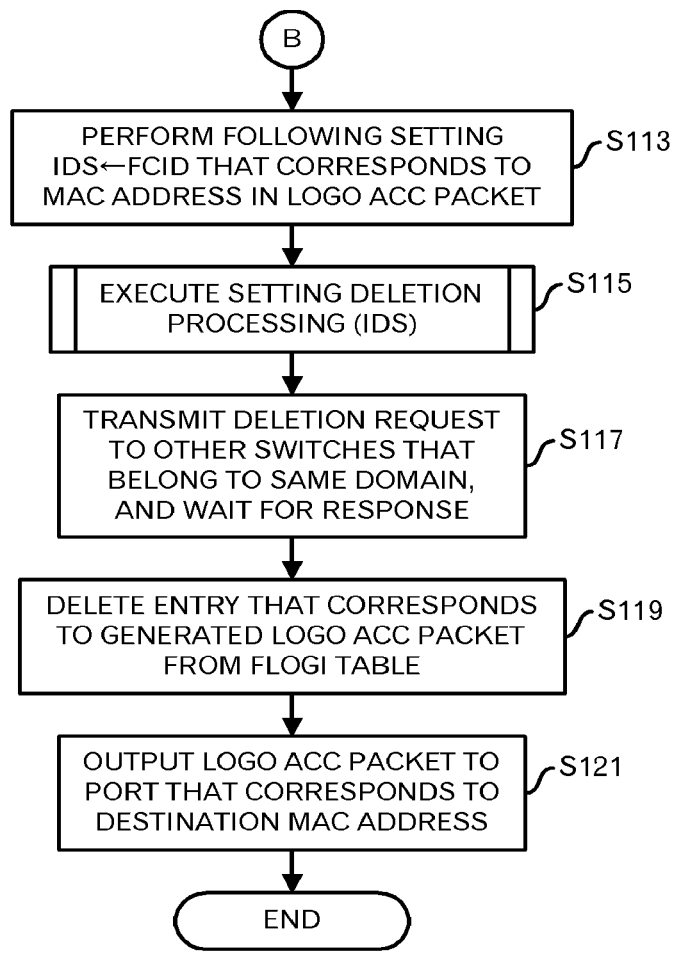
FIG. 27 is a diagram depicting the processing flow of the processing executed by the switch that received the LOGO packet.

Shifting to an explanation of FIG. 27, the second FIP processing unit 1524 identifies, from the FLOGI table 153, a FCID that corresponds to a MAC address that is included in the LOGO ACC packet generated in the step S111. Then, the second FIP processing unit 1524 sets the identified FCID for a variable IDS that represents the identified FCID (step S113).

The second FIP processing unit 1524 outputs the variable IDS to the deletion processing unit 1525. Accordingly, the deletion processing unit 1525 executes setting deletion processing by using the variable IDS as an argument (step S115). The setting deletion processing will be explained using FIG. 28.

Figure 28:
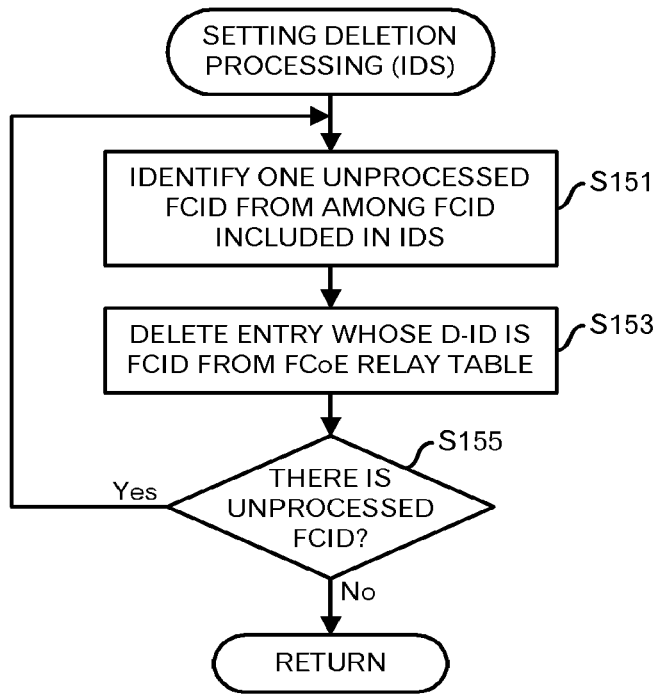
FIG. 28 is a diagram depicting a processing flow of setting deletion processing.

First, the deletion processing unit 1525 identifies one unprocessed FCID from among the FCID included in the variable IDS (FIG. 28: step S151). As will be explained later, when a CLV packet is received, there are cases where there are plural FCID. Therefore, the processing of step S151 is executed.

The deletion processing unit 1525 deletes, from the FCoE relay table 15152, an entry whose D-ID is the FCID that was identified in the step S151 (step S153).

The deletion processing unit 1525 determines whether there is an unprocessed FCID (step S155). When there is an unprocessed FCID (step S155: Yes route), the processing returns to the step S151 in order to process the next FCID. On the other hand, when there are no unprocessed FCID (step S155: No route), the processing returns to the calling source processing.

By executing processing such as described above, it is possible to prevent settings for a node for which logout has been performed from remaining in the FCoE relay table 15152. By using timeout monitoring when settings remain due to an implicit logout that occurs by cutting the connection with the end node 3 or the like, it is possible to prevent the settings from remaining.

Returning to the explanation of FIG. 27, the second FIP processing unit 1524 transmits a deletion request to other switches that belong to the same domain as this switch, and waits for a response from the transmission destination switch (step S117). The deletion request includes at least the variable IDS. Processing of the switches that received the deletion request will be explained later.

After receiving the response, the second FIP processing unit 1524 deletes, from the FLOGI table 153, an entry that corresponds to the LOGO ACC packet that was generated in the step S111 (step S119).

The second FIP processing unit 1524 outputs the LOGO ACC packet to a port that corresponds to a destination MAC address included in the LOGO ACC packet (step S121). The processing then ends.

By executing processing such as described above, it becomes possible to execute the deletion of settings for each switch. Therefore, it becomes possible to prevent a concentrated load at a specific apparatus (for example, the FCoE controller 5) on a network.

Figure 29:
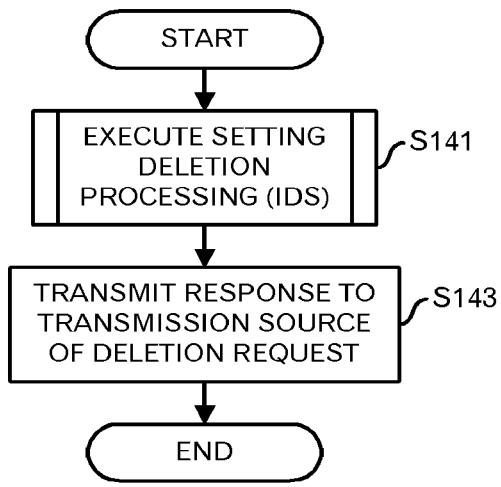
FIG. 29 is a diagram depicting a processing flow of processing executed by a switch that received a deletion request.

Next, processing that is executed by a switch that received the deletion request will be explained by using FIG. 29.

First, the deletion request that was received by the switch is outputted to the protocol processing unit 152 by way of the inner port B. Then, the second FIP processing unit 1524 in the protocol processing unit 152 outputs the variable IDS that is included in the deletion request to the deletion processing unit 1525. Accordingly, the deletion processing unit 1525 executes the setting deletion processing by using the variable IDS as an argument (FIG. 29: step S141). The setting deletion processing is as explained by using FIG. 28. Therefore, the explanation is omitted here.

The deletion processing unit 1525 generates a response that represents that the deletion has been completed, and transmits that response to the transmission source of the deletion request (step S143). The processing then ends.

By executing processing such as described above, it becomes possible to delete settings even for switches that belong to the same domain as a switch that generated a LOGO ACC packet.

Figure 30:
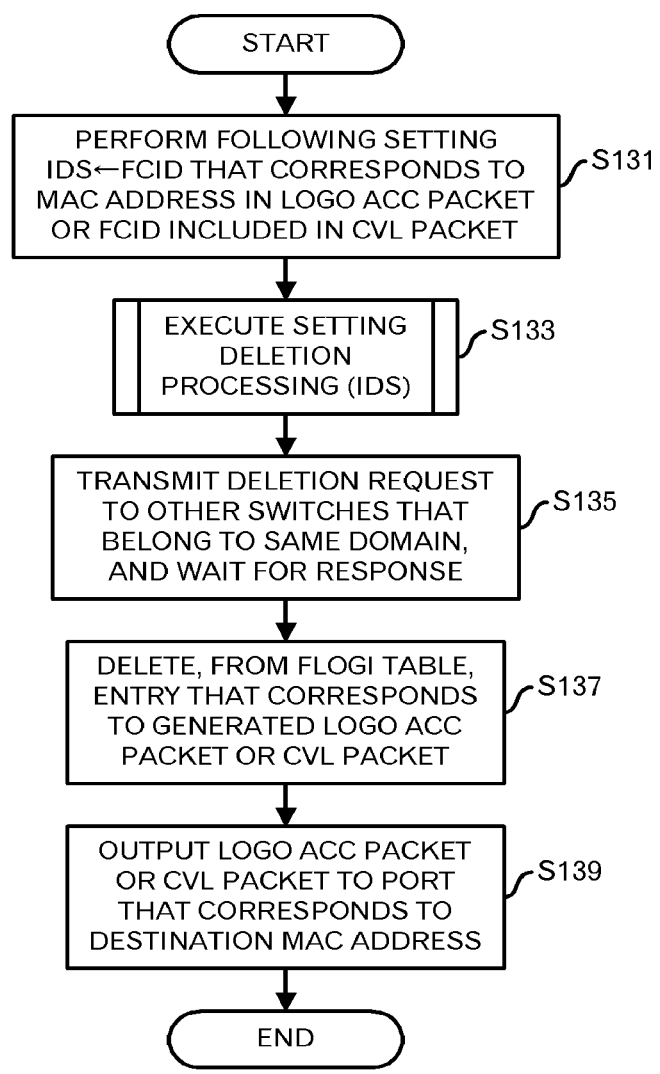
FIG. 30 is a diagram depicting a processing flow of processing executed by a switch that received a LOGO ACC packet or a CVL packet.

Processing executed by a switch that received a LOGO ACC packet or a CVL packet is as illustrated in FIG. 30. As illustrated in FIG. 30, this processing is the same as the processing of steps S113 to S121. Therefore, the explanation is omitted here. However, as was described above, the number of a FCID included in a CVL packet is not limited to 1, and there are cases in which the number is 0, and cases in which there are more than one.

Next, processing that is executed by the FCoE relay processing unit 15151 in the packet processing unit 1515 will be explained by using FIG. 31.

Figures 31, 33:
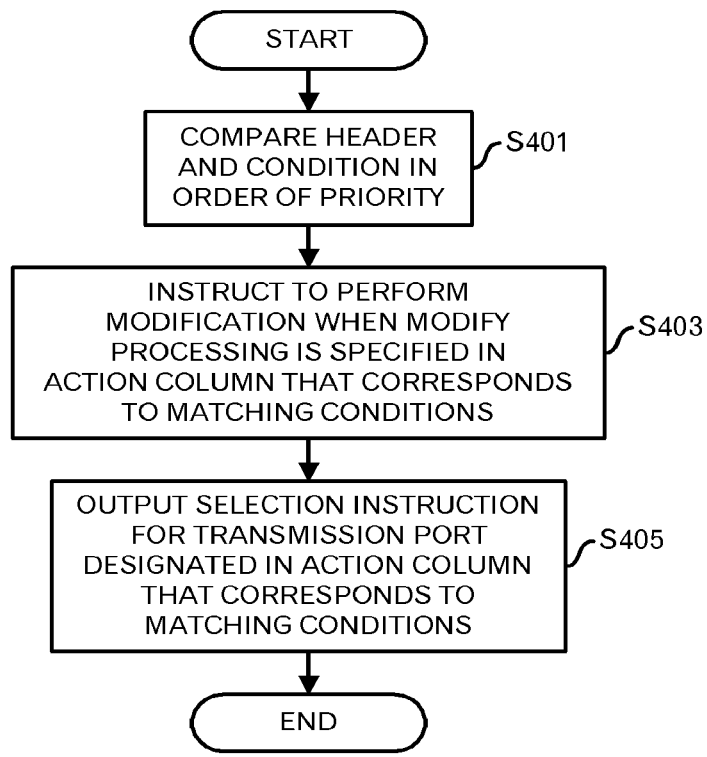
FIG. 31 is a diagram depicting a processing flow of processing executed by an FCoE relay processing unit in a packet processing unit.
FIG. 33 is a diagram depicting an example of the FLOGI table.

First, the FCoE relay processing unit 15151 compares a header of the received packet (a header of a MAC frame portion and a header of a FC frame portion) and conditions prescribed in a Match column of the FCoE relay table 15152 in order of priority, and identifies a first line where the conditions match (FIG. 31: step S401).

Then, when modify processing corresponding to the matching conditions is specified in the Action column, the FCoE relay processing unit 15151 instructs the packet updater 1513 to perform modification as specified (step S403). After the packet updater 1513 performed the modify processing for the header of the packet stored in the packet buffer 1512 as instructed, the packet updater 1513 outputs data of the modified packet to the demultiplexer 1514. When there is no instruction, the packet updater 1513 does not update the packet stored in the packet buffer 1512, and outputs the packet as is to the demultiplexer 1514.

Furthermore, the FCoE relay processing unit 15151 outputs a port selection instruction for a transmission port designated in the Action column that corresponds to the matching conditions to the demultiplexer 1514 (step S405).

The processing then ends. As a result, the demultiplexer 1514 outputs the packet from the packet updater 1513 to the designated transmission port.

By executing processing such as described above, it becomes possible to suitably relay a received packet to a destination.

As described above, in this embodiment, a specific apparatus (for example, the FCoE controller 5) does not make the relay settings for each switch, and the relay settings are made at each switch. Therefore, a load of the setting processing is not concentrated at that apparatus.

Moreover, each switch does not hold information about domains other than a domain to which the switch belongs (for example, information representing how the domains other than the domain to which that switch belongs are connected to the outside of that domain). Each switch may hold information representing how the domain to which the switch belongs is connected to the outside, or how the domain is connected to other domains. Therefore, management is performed in the same way as for a conventional Link Aggregation Group (LAG), so only few resources are used, and processing becomes simple.

Moreover, in regard to a direction from a terminal of a tree to a root of the tree, relay settings are not made for individual FCID. Therefore, it becomes possible to suppress consumption of memory space used by the FCoE relay table 15152.

Moreover, it is possible to relay so that a packet can arrive at a destination without passing over useless paths. In other words, relaying packets in a network can be performed efficiently.

Embodiment 2

Figure 32:
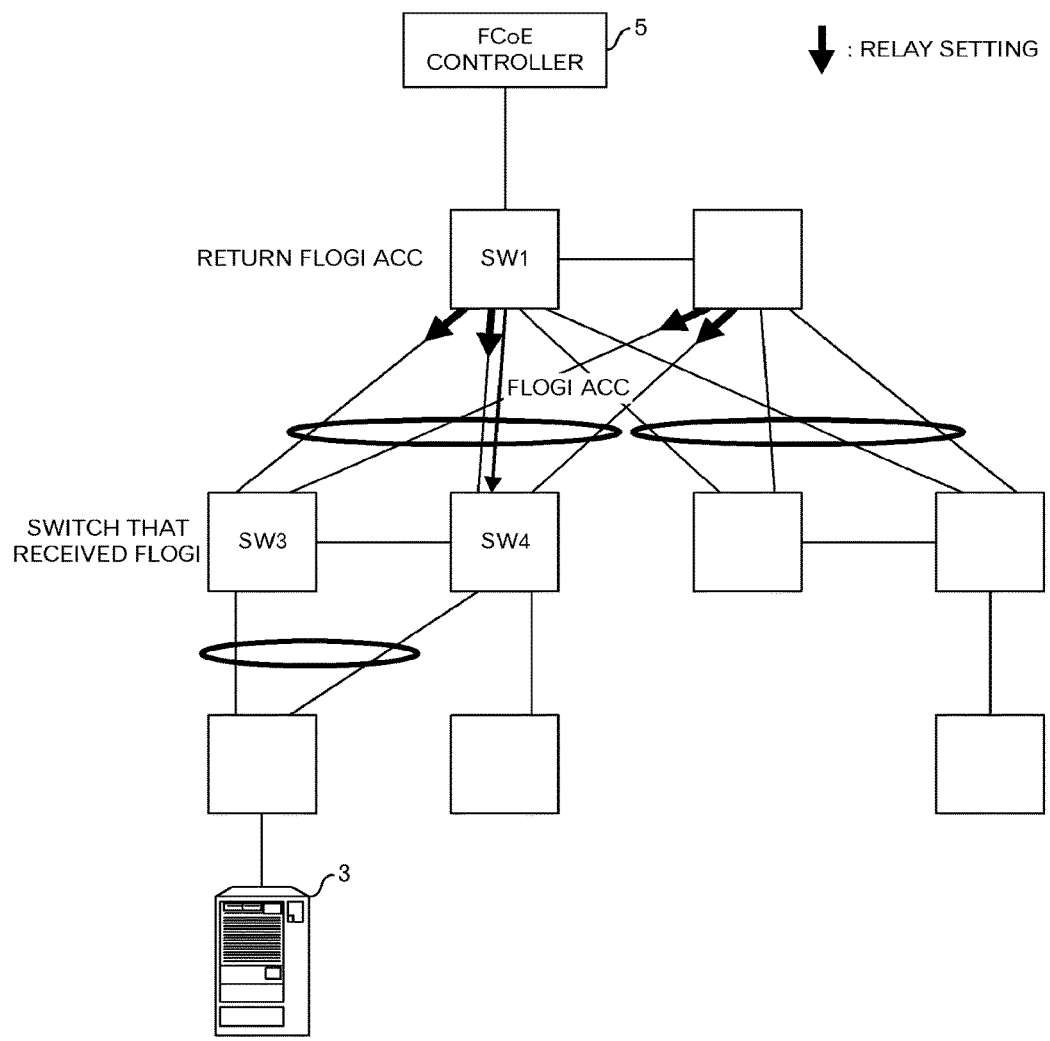
FIG. 32 is a diagram for explaining an outline of a second embodiment.

The first embodiment is based on a premise that a path for a FLOGI packet and a path for a FLOGI ACC packet are the same, however, depending on circumstances, the path for a FLOGI packet and the path for a FLOGI ACC packet are different. For example, there is a case such as illustrated in FIG. 32 in which a switch that received a FLOGI packet in the domain B is the switch SW3, and a switch that received a FLOGI ACC packet in the domain B is the switch SW4. In the second embodiment, a method for operating without problems even when the path for a FLOGI packet and the path for a FLOGI ACC packet are different will be explained.

A system in the second embodiment is basically the same as the system in the first embodiment, however, contents of the FLOGI table 153 for the switches are different. FIG. 33 illustrates an example of the FLOGI table 153 in this second embodiment. In the example in FIG. 33, information that includes a transmission source MAC address of a FLOGI packet and a FDISC packet and a transmission source WWPN, an identifier of a switch that received the FLOGI packet and the FDISC packet, an identifier of a port, a FPMA that is assigned to a login port, and a FCID that is assigned to the login port are stored.

Next, an outline of processing that is performed in the second embodiment will be explained by using FIGS. 34 to 38.

Figure 34:
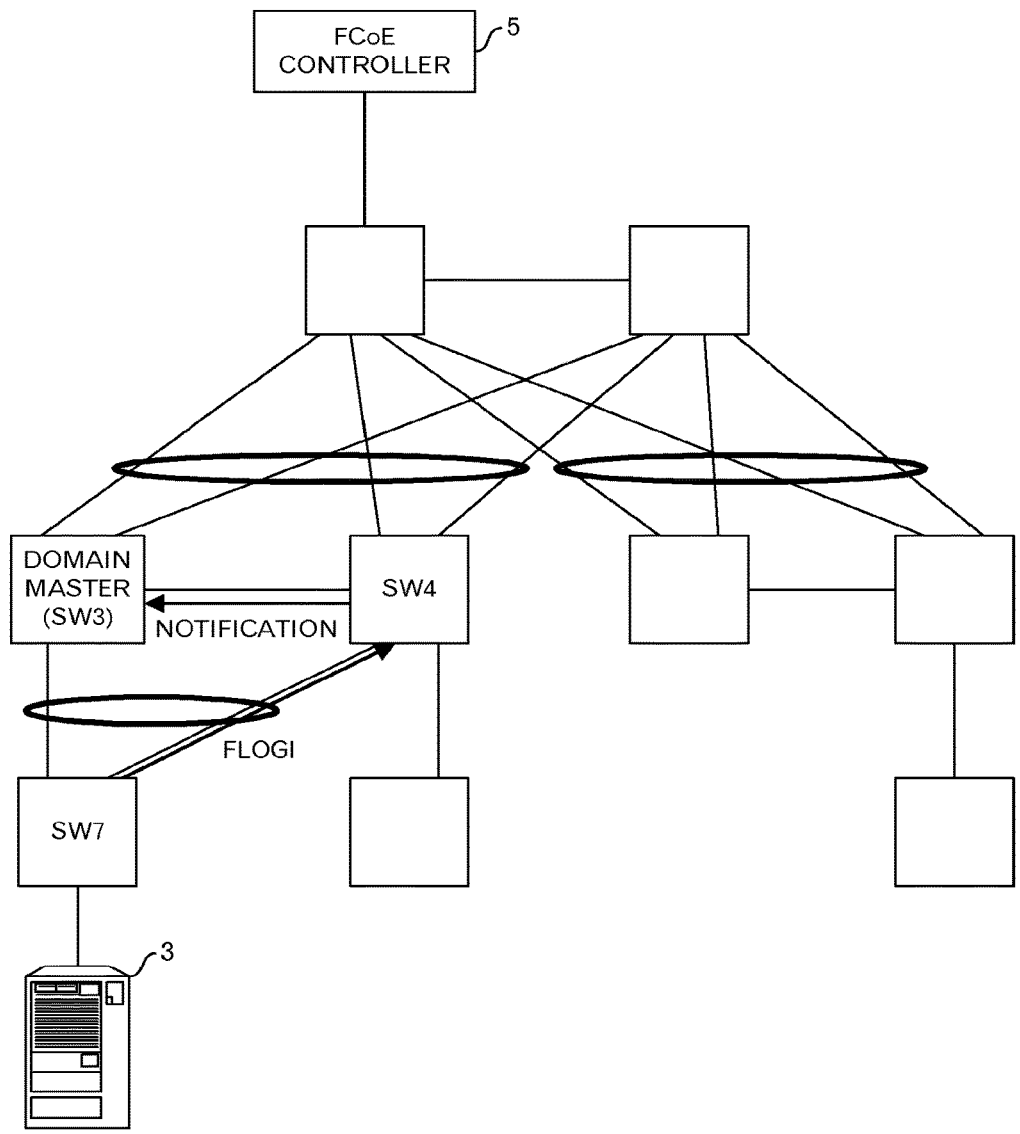
FIG. 34 is a diagram for explaining the outline of the second embodiment.

For example, as illustrated in FIG. 34, a FLOGI packet that was outputted from an end node 3 is relayed to the switch SW4 by the switch SW7. In this case, the switch SW4 transmits information that is included in the FLOGI packet, an identifier of a port that received the FLOGI packet, and an identifier of the switch that received the FLOGI packet (here, that is the switch SW4) to a switch that is a domain master (here, that is the switch SW3) among switches that belong to the domain B. The switch SW3 that is the domain master stores the received information in the FLOGI table 153.

Figure 35:
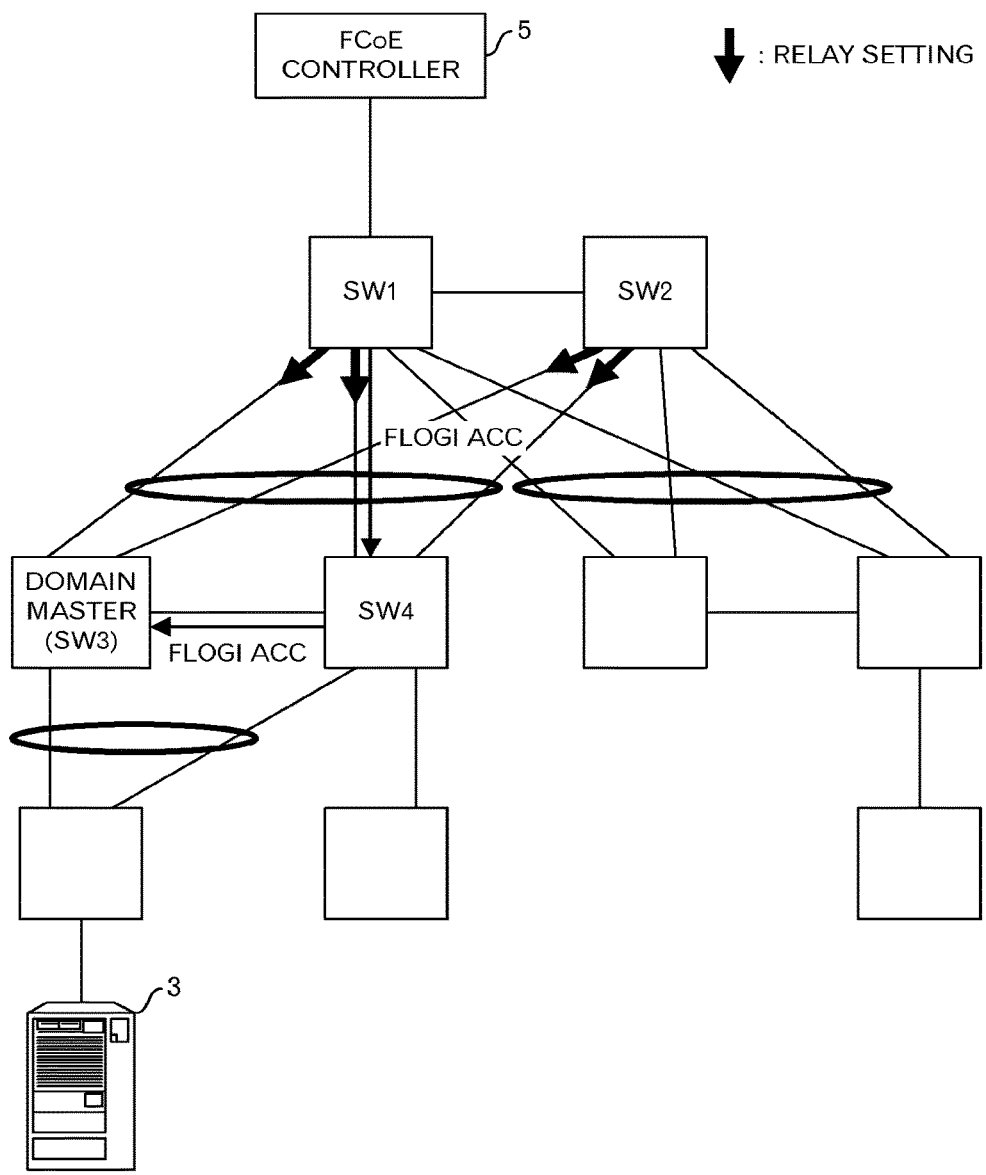
FIG. 35 is a diagram for explaining the outline of the second embodiment.

Moreover, as illustrated in FIG. 35, assume that a FLOGI ACC packet that was outputted from the FCoE controller 5 is relayed to the switch SW4 by the switch SW1. As a result, the switch SW4 transmits the FLOGI ACC packet to the switch that is the domain master (here, that is switch SW3) among the switches that belong to the domain B.

Figure 36:
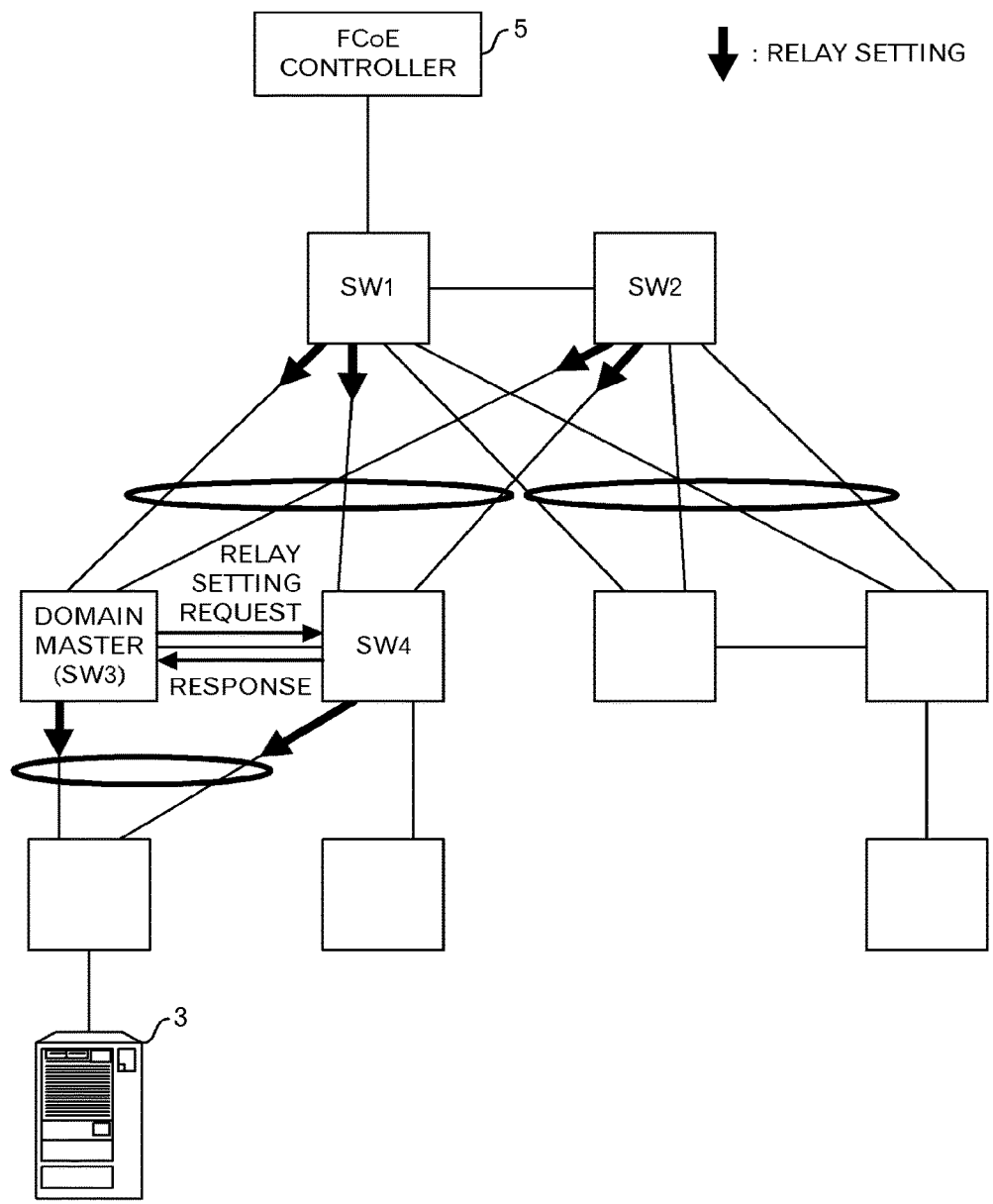
FIG. 36 is a diagram for explaining the outline of the second embodiment.

Then, as illustrated in FIG. 36, the switch SW3 that is the domain master executes processing that is the same as in the first embodiment based on the received FLOGI ACC packet. In other words, the switch SW3 makes settings for relaying a packet whose destination is the end node 3, and transmits a relay setting request to the switch SW4 that belongs to the same domain (domain B). Accordingly, the switch SW4 makes settings for relaying the packet whose destination is the end node 3 based on information included in the relay setting request, and transmits a response to the switch SW3.

Figure 37:
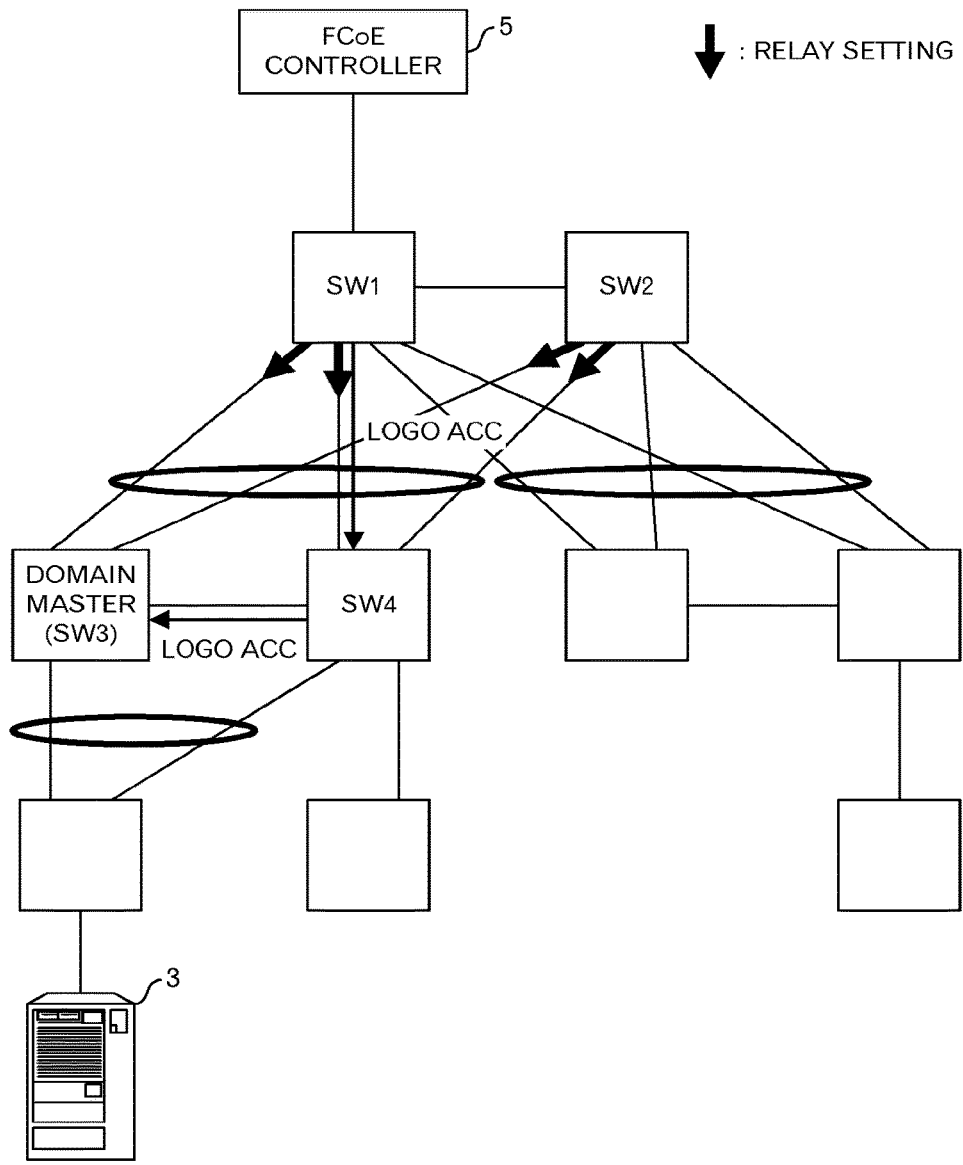
FIG. 37 is a diagram for explaining the outline of the second embodiment.

Moreover, as illustrated in FIG. 37, assume that a LOGO ACC packet that was outputted from the FCoE controller 5 is relayed to the switch SW4 by the switch SW1. As a result, the switch SW4 transmits the LOGO ACC packet to the switch that is the domain master (here, that is the switch SW3) among the switches that belong to the domain B.

Figure 38:
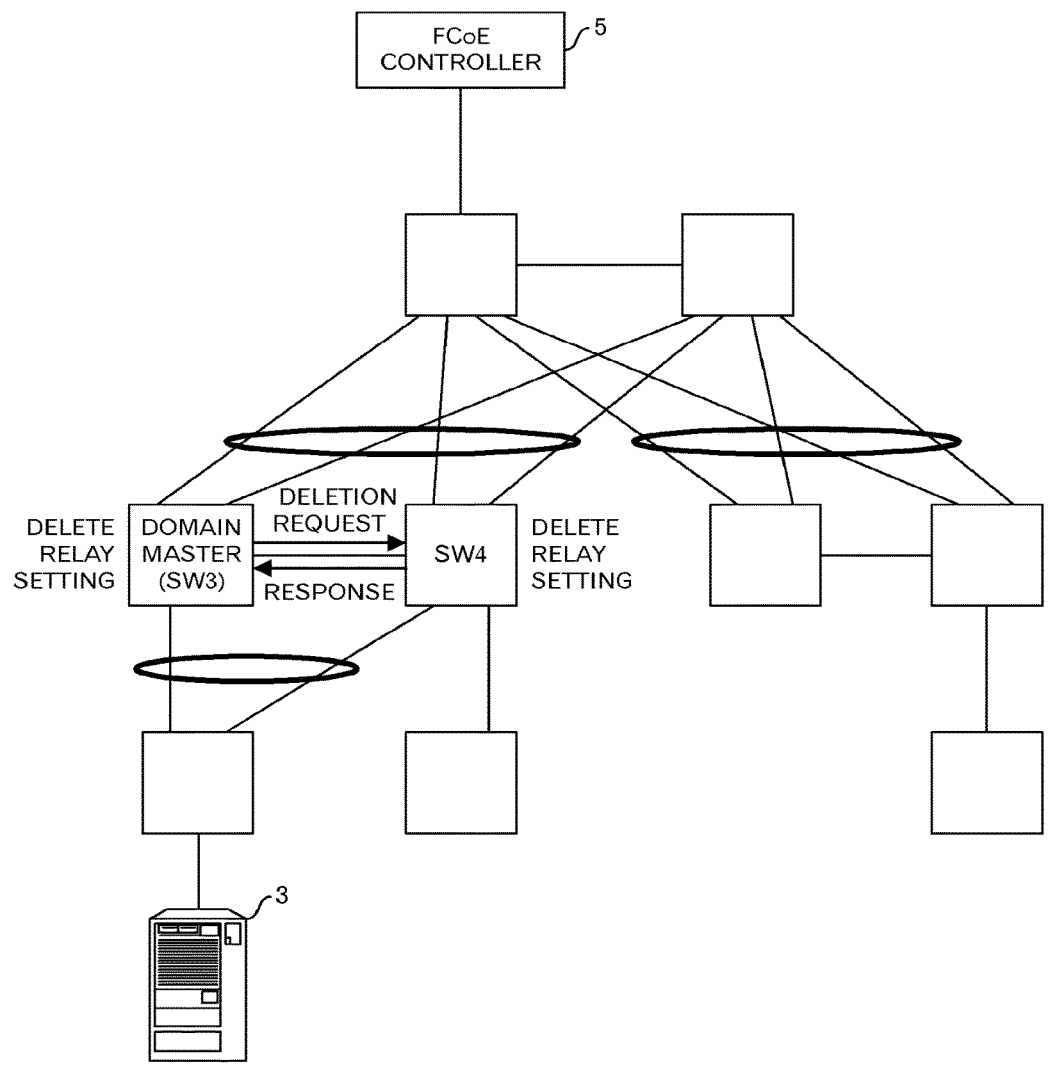
FIG. 38 is a diagram for explaining the outline of the second embodiment.

Then, as illustrated in FIG. 38, the switch SW3 that is the domain master executes processing that is the same as in the first embodiment based on the received LOGO ACC packet. In other words, switch SW3 deletes the settings for relaying the packet whose destination is the end node 3, and transmits a deletion request to the switch SW4 that belongs to the same domain (domain B). Accordingly, the switch SW4 deletes the settings for relaying the packet whose destination is the end node 3 based on information that was included in the deletion request, and transmits a response to the switch SW3.

The operation when the FCoE controller 5 outputted a CVL packet is the same as in the case of a LOGO ACC packet.

Next, processing that is performed in the second embodiment will be explained in detail by using FIGS. 39 to 45. The initial setting processing that is executed when the switches are activated is the same as the initial setting processing in the first embodiment. Therefore, firstly, processing that is executed by a switch that received a FLOGI packet and a FDISC packet will be explained. Because the processing executed by the switch that received the FDISC packet is the same as the processing executed by the switches that received the FLOGI packet, an example of a FLOGI packet will be explained here.

Figure 39:
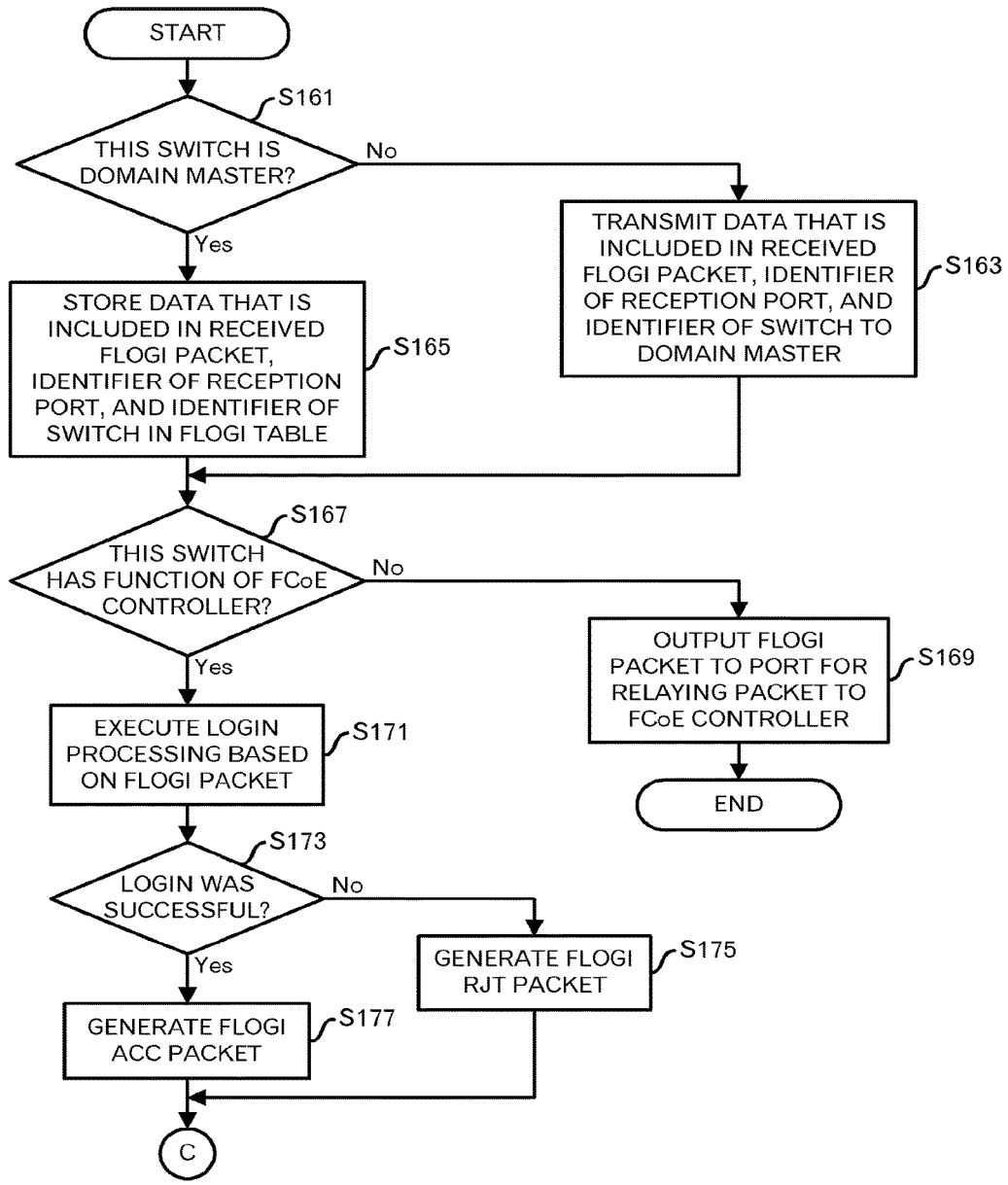
FIG. 39 is a diagram depicting a processing flow of processing executed by a switch that received a FLOGI packet or a FDISC packet.

First, the FLOGI packet that is received by a switch (hereinafter, referred to as this switch) is outputted to the protocol processing unit 152 by way of the inner port B. Then, the first FIP processing unit 1522 of the protocol processing unit 152 determines whether this switch is a domain master (FIG. 39: step S161). A switch that is a domain master is a switch that manages the FLOGI table 153 of a domain to which the switch belongs. In this embodiment, one of the switches in each domain is a domain master.

When this switch is not a domain master (step S161: No route), the first FIP processing unit 1522 transmits data that is included in the received FLOGI packet (more specifically, a transmission source MAC address, and a transmission source WWPN), an identifier of a reception port, and an identifier of a switch (here, an identifier of this switch) to the domain master (step S163). In this embodiment, assume that a domain master holds data for identifying logical links to which each of ports in the domain belong (for example, data that correlates a combination of an identifier of a port and an identifier of a switch with an identifier of a logical link).

On the other hand, when this switch is a domain master (step S161: Yes route), the first FIP processing unit 1522 stores data that is included in the received FLOGI packet, the identifier of the reception port, and the identifier of the switch in the FLOGI table 153 (step S165). At the time of this processing, a FPMA and a FCID are not stored.

The first FIP processing unit 1522 determines whether this switch has a function of an FCoE controller (in other words, whether the switch is the FCoE controller 5) (step S167).

When this switch does not have a function of an FCoE controller (step S167: No route), the first FIP processing unit 1522 outputs the FLOGI packet to a port for relaying a packet to the FCoE controller 5 (step S169). The processing then ends.

On the other hand, when this switch has a function of an FCoE controller (step S167: Yes route), the first FIP processing unit 1522 executes login processing based on the FLOGI packet (step S171). The login processing is processing that determines whether a FCID can be assigned to a transmission source of a FLOGI packet.

The first FIP processing unit 1522 determines whether login was successful (in other words, whether a FCID can be assigned to a transmission source of a FLOGI packet) (step S173). When login was not successful (step S173: No route), the first FIP processing unit 1522 generates a FLOGI RJT packet (step S175). On the other hand, when login was successful (step S173: Yes route), the first FIP processing unit 1522 generates a FLOGI ACC packet (step S177). The processing then shifts to step S179 in FIG. 40 by way of a terminal C.

Figure 40:
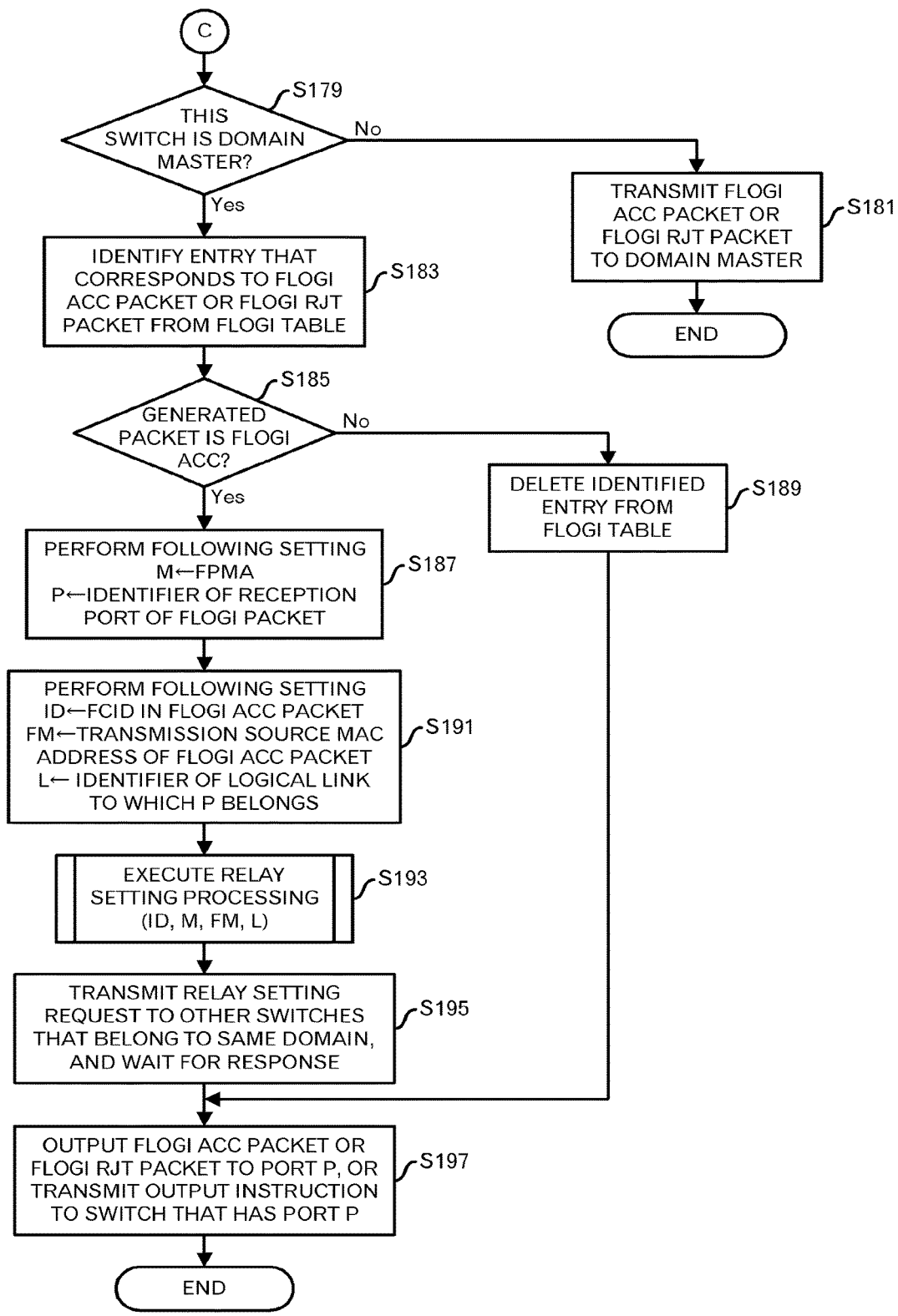
FIG. 40 is a diagram depicting the processing flow of the processing executed by the switch that received the FLOGI packet or the FDISC packet.

Shifting to an explanation of FIG. 40, the first FIP processing unit 1522 determines whether this switch is a domain master (step S179). When this switch is not a domain master (step S179: No route), the first FIP processing unit 1522 transmits, to the domain master, an entry that corresponds to the FLOGI ACC packet that was generated in the step S177 or the FLOGI RJT packet that was generated in the step S175 (step S181). The processing then ends.

On the other hand, when this switch is a domain master (step S179: Yes route), the first FIP processing unit 1522 identifies, from the FLOGI table 153, an entry that corresponds to the FLOGI ACC packet that was generated in the step S177 or the FLOGI RJT packet that was generated in the step S175 (step S183). The entry that is identified in the step S183 includes a transmission source MAC address of the FLOGI packet and an identifier of a reception port of the FLOGI packet.

The first FIP processing unit 1522 determines whether the generated packet is a FLOGI ACC packet (step S185). When the processing passes through step S177, the generated packet is a FLOGI ACC packet. When the generated packet is not a FLOGI ACC packet (step S185: NO route), a FLOGI RJT packet was generated. Therefore, the first FIP processing unit 1522 deletes the entry that was identified in the step S183 from the FLOGI table 153 (step S189). The processing then shifts to step S197.

On the other hand, when the generated packet is a FLOGI ACC packet (step S185: Yes route), the first FIP processing unit 1522 sets a FPMA for a variable M that represents a destination MAC address, and sets the identifier of the reception port of the FLOGI packet for a variable P that represents an identifier of a reception port (step S187).

The first FIP processing unit 1522 makes the following settings (step S191). More specifically, the first FIP processing unit 1522 sets the FCID that is included in the FLOGI ACC packet for a variable ID that represents a FCID, sets the transmission source MAC address of the FLOGI ACC packet for a variable FM that represents a transmission source MAC address, and sets an identifier of a logical link to which a port P belongs for a variable L that represents a logical link that is used.

The first FIP processing unit 1522 outputs the variable ID, the variable M, the variable FM and the variable L to the relay setting unit 1523. Accordingly, the relay setting unit 1523 executes the relay setting processing by using the variable ID, the variable M, the variable FM and the variable L as arguments (step S193). Because the relay setting processing is the same as explained in the first embodiment, the explanation is omitted here.

The first FIP processing unit 1522 transmits a relay setting request to other switches that belong to the same domain as this switch, and waits for a response from the transmission destination switch (step S195). The relay setting request includes at least the variable ID, the variable M, the variable FM and the variable L.

When receiving the response, the first FIP processing unit 1522 outputs the FLOGI ACC packet that was generated in the step S177 or the FLOGI RJT packet that was generated in the step S175 to the port P, or transmits an output instruction to a switch that has the port P to perform output to the port P when there is no port P (step S197). The processing then ends.

By executing processing such as described above, it becomes possible to perform relay setting at each switch. Therefore, it becomes possible to prevent a concentrated load at a specific device in a network. Particularly, because a domain master manages the FLOGI table 153, it is possible to also handle a case in which a switch that received a FLOGI packet differs from a switch that received a FLOGI ACC packet.

Next, processing that is executed by a domain master that received the information transmitted in the step S163 will be explained by using FIG. 41.

Figure 41:
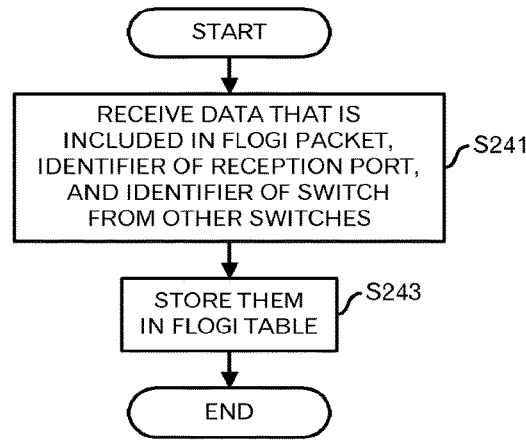
FIG. 41 is a diagram depicting a processing flow of processing executed by a domain master.

First, the first FIP processing unit 1522 of a switch that is a domain master receives data that is included in a FLOGI packet, an identifier of a reception port and an identifier of the switch (FIG. 41: step S241).

The first FIP processing unit 1522 stores the data that is included in the FLOGI packet, the identifier of the reception port and the identifier of the switch in the FLOGI table 153 (step S243). The processing then ends.

Figure 42:
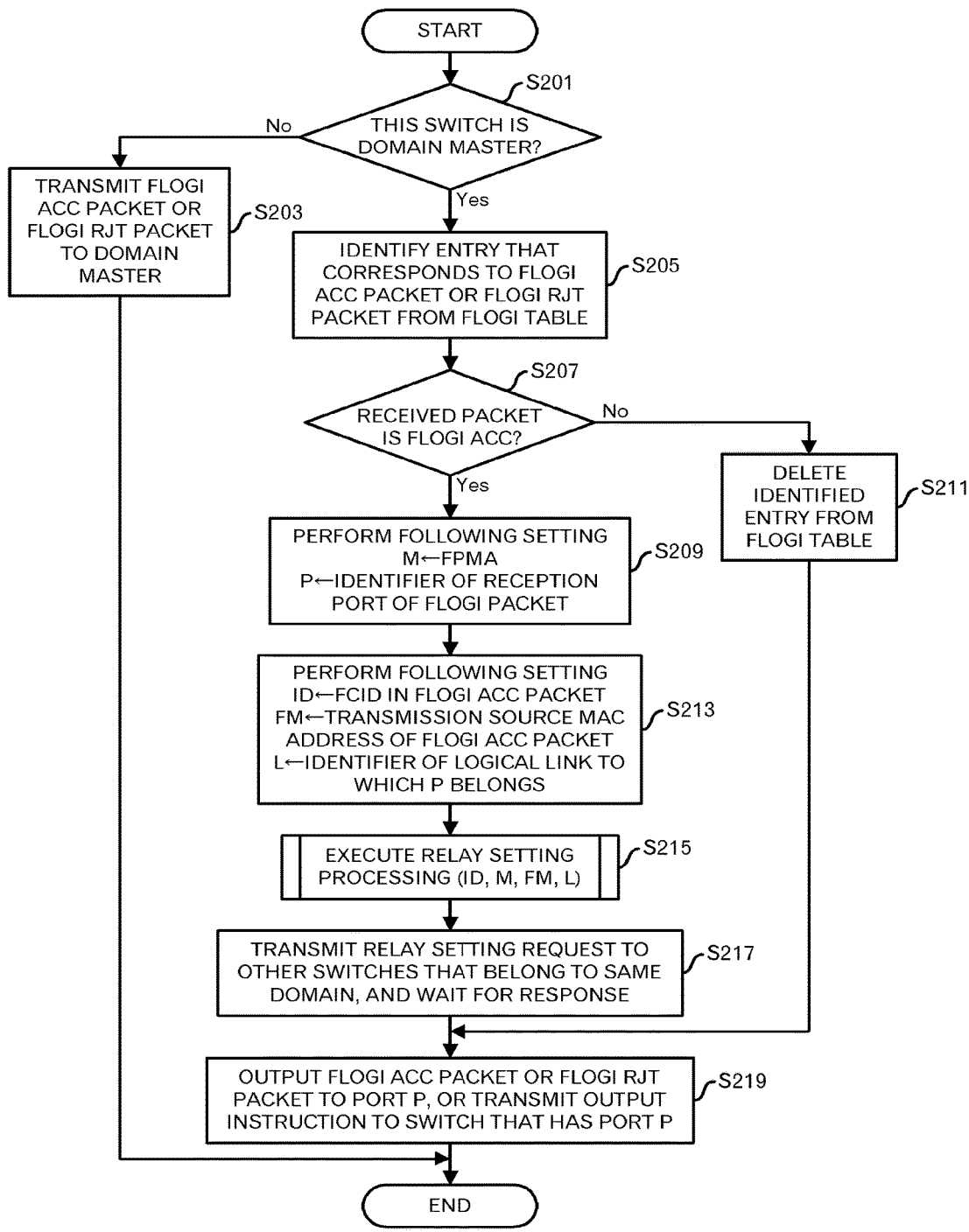
FIG. 42 is a diagram depicting a processing flow of processing executed by a switch that received a FLOGI ACC packet or a FLOGI RJT packet.

Next, processing that is executed by the switch that received the FLOGI ACC packet or the FLOGI RJT packet will be explained by using FIG. 42.

First, the FLOGI ACC packet and the FLOGI RJT packet that a switch (hereinafter, referred to as this switch) received are outputted to the protocol processing unit 152 by way of inner port B. Then, the first FIP processing unit 1522 of the protocol processing unit 152 determines whether this switch is a domain master (FIG. 42: step S201). When the switch is not a domain master (step S201: NO route), the first FIP processing unit 1522 transmits the received FLOGI ACC packet or FLOGI RJT packet to the switch that is the domain master (step S203). Processing then ends.

On the other hand, when this switch is a domain master (step S201: Yes route), the first FIP processing unit 1522 identifies, from the FLOGI table 153, an entry that corresponds to the received FLOGI ACC packet or the FLOGI RJT packet (step S205). The entry that is identified in the step S205 includes a transmission source MAC address of the FLOGI packet, and an identifier of a reception port of the FLOGI packet.

The first FIP processing unit 1522 determines whether the received packet is a FLOGI ACC packet (step S207). When the received packet is not a FLOGI ACC packet (step S207: No route), a FLOGI RJT packet was received, so the first FIP processing unit 1522 deletes the entry that was identified in the step S205 from the FLOGI table 153 (step S211). The processing then shifts to step S219.

On the other hand, when the received packet is a FLOGI ACC packet (step S207: Yes route), the first FIP processing unit 1522 sets the transmission source MAC address of the FLOGI packet for a variable M that represents a destination MAC address, and sets the identifier of the reception port of the FLOGI packet for a variable P that represents an identifier of a reception port (step S209).

The first FIP processing unit 1522 makes the following settings (step S213). More specifically, the first FIP processing unit 1522 sets a FCID that is included in the FLOGI ACC packet for a variable ID that represents a FCID, sets the transmission source MAC address of the FLOGI ACC packet for a variable FM that represents a transmission source MAC address, and sets an identifier of a logical link to which a port P belongs for a variable L that represents a logical link that is used.

The first FIP processing unit 1522 outputs the variable ID, the variable M, the variable FM and the variable L to the relay setting unit 1523. Accordingly, the relay setting unit 1523 executes the relay setting processing by using the variable ID, the variable M, the variable FM and the variable L as parameters (step S215). Because the relay setting processing is the same as explained in the first embodiment, the explanation is omitted here.

The first FIP processing unit 1522 transmits a relay setting request to other switches that belong to the same domain as this switch, and waits for a response from a transmission destination switch (step S217). The relay setting request includes at least the variable ID, the variable M, the variable FM and the variable L.

After receiving the response, the first FIP processing unit 1522 outputs the received FLOGI ACC packet or the FLOGI RJT packet to the port P, or, issues an output instruction to a switch that has the P port to perform output to the port P when there is no P port (step S219). The processing then ends.

By executing processing such as described above, it becomes possible for a domain master to process a FLOGI ACC packet and a FLOGI RJT packet.

Processing that is executed by a switch that received the relay setting request is the same as that explained in the first embodiment. Therefore, the explanation is omitted.

Figure 43:
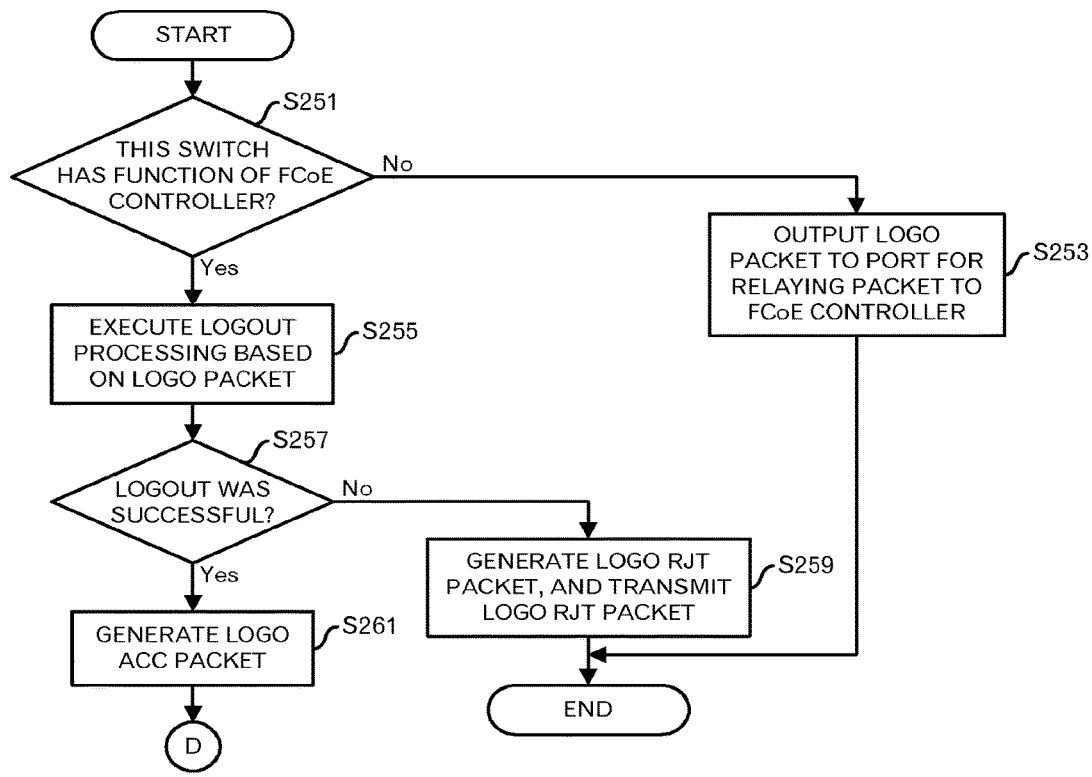
FIG. 43 is a diagram depicting a processing flow of processing executed by a switch that received a LOGO packet.

Next, processing that is executed by a switch that received a LOGO packet will be explained by using FIGS. 43 and 44.

First, a LOGO packet that is received by a switch (hereinafter, referred to as this switch) is outputted to the protocol processing unit 152 by way of the inner port B. Then, the second FIP processing unit 1524 in the protocol processing unit 152 determines whether this switch has a function of FCoE controller (in other words, whether the switch is the FCoE controller 5) (FIG. 43: step S251).

When this switch does not have a function of an FCoE controller (step S251: No route), the second FIP processing unit 1524 outputs the LOGO packet to a port for relaying a packet to the FCoE controller 5 (step S253). The processing then ends.

On the other hand, when this switch has a function of an FCoE controller (step S251: Yes route), the second FIP processing unit 1524 executes logout processing based on the LOGO packet (step S255). The logout processing is processing for determining whether it is possible to terminate assignment of a FCID for a transmission source of a LOGO packet.

The second FIP processing unit 1524 determines whether logout was successful (whether assignment of a FCID for a transmission source of a LOGO packet could be terminated) (step S257). When logout was not successful (step S257: No route), the second FIP processing unit 1524 generates a LOGO RJT packet, and transmits the LOGO RJT packet (step S259). The processing then ends. The LOGO RJT packet is relayed in the same way as a normal packet. Therefore, a detailed explanation will be omitted here.

On the other hand, when logout was successful (step S257: Yes route), the second FIP processing unit 1524 generates a LOGO ACC packet (step S261). Then, processing shifts to step S263 in FIG. 44 by way of a terminal D.

Figure 44:
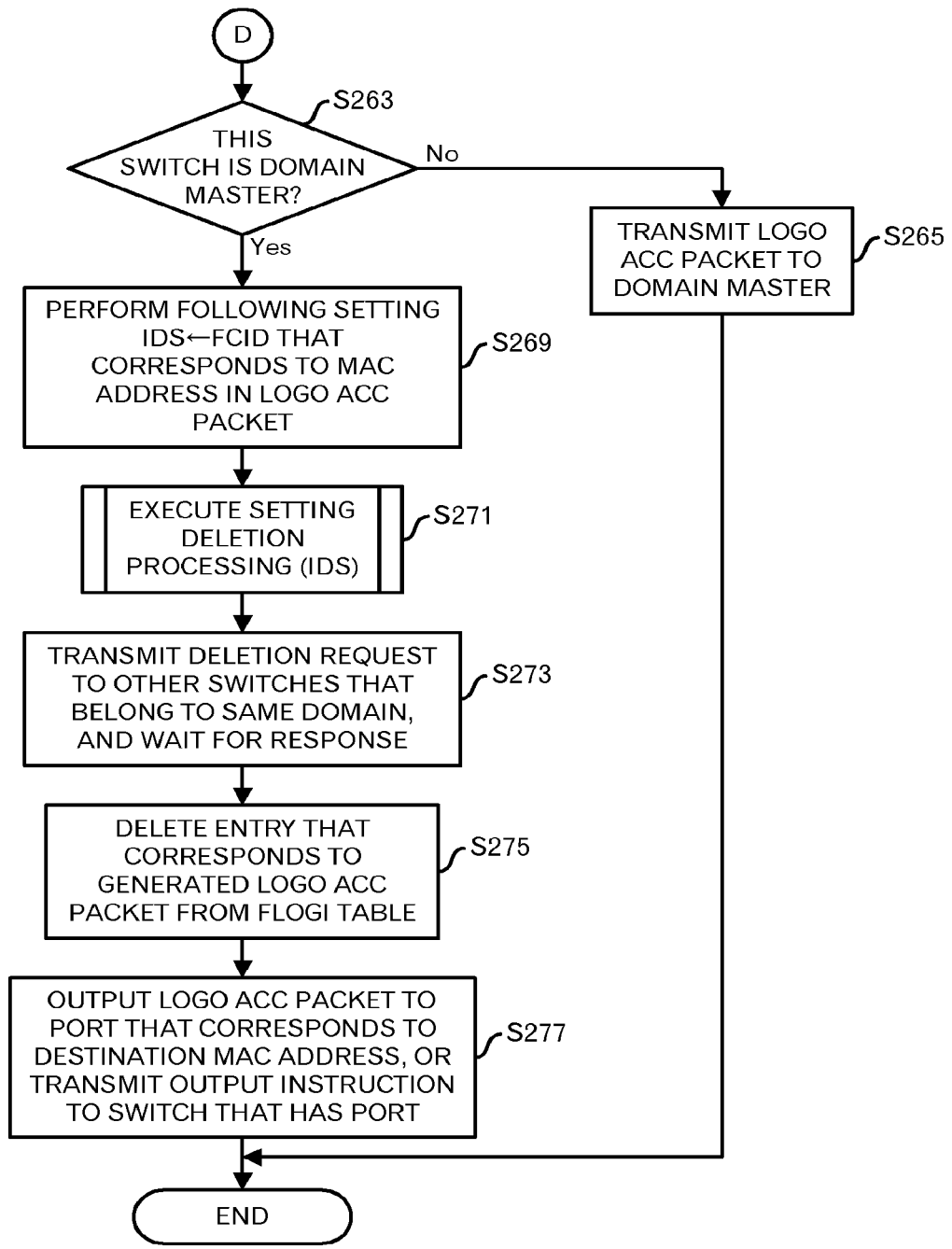
FIG. 44 is a diagram depicting the processing flow of the processing executed by the switch that received the LOGO packet.

Shifting to an explanation of FIG. 44, the second FIP processing unit 1524 determines whether this switch is a domain master (step S263). When this switch is not a domain master (step S263: No route), the second FIP processing unit 1524 transmits the LOGO ACC packet to the domain master (step S265). The processing then ends.

When this switch is a domain master (step S263: YES route), the second FIP processing unit 1524 identifies, from the FLOGI table 153, a FCID that corresponds to a MAC address that is included in the LOGO ACC packet generated in the step S261. Then, the second FIP processing unit 1524 sets the identified FCID for a variable IDS that represents a FCID (step S269).

The second FIP processing unit 1524 outputs the variable IDS to the deletion processing unit 1525. Accordingly, the deletion processing unit 1525 executes setting deletion processing by using the variable IDS as an argument (step S271). The setting deletion processing is the same as that explained in the first embodiment, so the explanation is omitted.

The second FIP processing unit 1524 transmits a deletion request to other switches that belong to the same domain as this switch, and waits for a response from a transmission destination switch (step S273). The deletion request includes at least the variable IDS.

After the response is received, the second FIP processing unit 1524 deletes, from the FLOGI table 153, an entry that corresponds to the LOGO ACC packet that was generated in the step S261 (step S275).

The second FIP processing unit 1524 outputs the LOGO ACC packet to a port that corresponds to a destination MAC address included in the LOGO ACC packet, or when there is not the port, transmits an output instruction to a switch that has the port to perform output to the port (step S277). The processing then ends.

Figure 45:
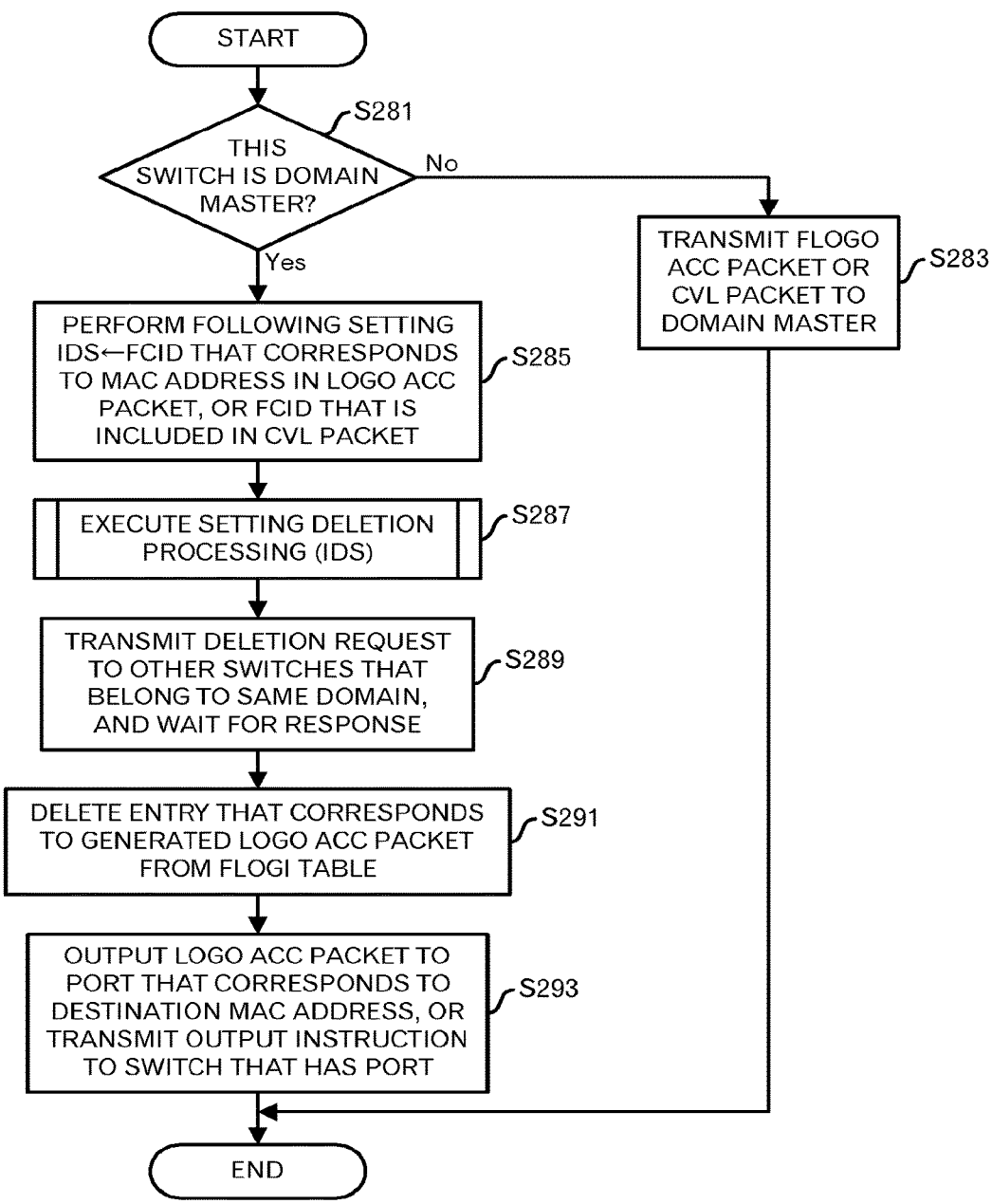
FIG. 45 is a diagram depicting a processing flow of processing executed by a switch that received a LOGO ACC packet.

Processing that is executed by a switch that received a LOGO ACC packet or a CVL packet is as illustrated in FIG. 45. As illustrated in FIG. 45, this processing is the same as the processing from step S263 to step S277, so the explanation will be omitted here. However, as was described above, the number of FCID included in a CVL packet is not limited to 1, and there are cases in which the number is 0, and cases in where the number is greater than 1.

Processing that is executed by a switch that received a deletion request is the same as that explained in the first embodiment, so the explanation is omitted.

By executing processing such as described above, it becomes possible to execute deletion of settings at each switch. Therefore, it becomes possible to prevent a concentrated load at a specific device (for example, the FCoE controller 5) on a network. Particularly, because there is a domain master, it is also possible to handle a case in which a switch that received a LOGO ACC packet and a switch that received a FLOGI ACC packet are different.

Although one embodiment of this invention was explained above, this invention is not limited to those. For example, the functional block configuration of the switches SW1 to SW6, which is explained above, does not always correspond to actual program module configurations.

Moreover, the aforementioned data structure is a mere example, and may be changed. Furthermore, as for the processing flow, as long as the processing results do not change, the turns of the steps may be exchanged or the steps may be executed in parallel.

For example, a switch in the domain A may have a function of an FCoE controller.

Moreover, the end node 3 may be a switch.

Figure 46:
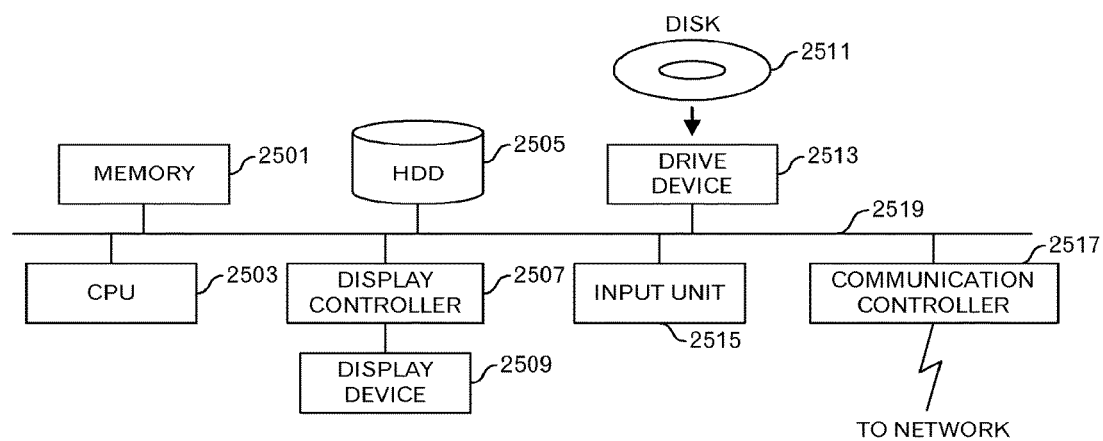
FIG. 46 is a functional block diagram of a computer.

In addition, the aforementioned end node 3 is a computer device as illustrated in FIG. 46. That is, a memory 2501 (storage device), a CPU 2503 (central processing unit), a hard disk drive (HOD) 2505, a display controller 2507 connected to a display device 2509, a drive device 2513 for a removable disk 2511, an input unit 2515, and a communication controller 2517 for connection with a network are connected through a bus 2519 as illustrated in FIG. 46. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned processing is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer device as stated above, the hardware such as the CPU 2503 and the memory 2501, the OS and the application programs systematically cooperate with each other, so that various functions as described above in details are realized.

The aforementioned embodiment is summarized as follows:

An information processing system relating to a first aspect of this embodiment includes: (A) plural switches that are connected in a tree form; (B) an information processing apparatus that is connected to one of the plural switches; and (C) a management apparatus that is connected to one of the plural switches and manages assignment of identifiers. And the information processing apparatus includes: a first memory; and a first processor configured to use the first memory and execute a first process. And the first process includes: (b1) transmitting an assignment request whose destination is the management apparatus. And the management apparatus includes: a second memory; and a second processor configured to use the second memory and execute a second process. And the second process includes: (c1) determining whether an identifier can be assigned to the information processing apparatus, based on the received assignment request; and transmitting a response that includes an identifier assigned to the information processing apparatus, upon determining that the identifier can be assigned to the information processing apparatus. And a first switch that is a switch of the plural switches and relays the assignment request and the response includes: a third memory; and a third processor configured to use the third memory and execute a third process. And the third process includes; (c2) making settings for relaying a packet whose destination is the information processing apparatus, based on information on a logical link that received the assignment request and the identifier included in the response; and transmitting, to first other switches that belong to a first domain to which the first switch belongs, a setting request that includes the information on the logical link that received the assignment request and the identifier included in the response.

Thus, because setting for relay is executed at each switch, a load of the setting processing is not concentrated at a specific switch.

Moreover, (c3) the aforementioned first other switches may make settings for relaying the packet whose destination is the information processing apparatus based on the information on the logical link and the identifier which are included in the setting request. Thus, it becomes possible to make the same settings as a transmission source switch of a setting request in switches that belong to the same domain.

Moreover, (c2-1) the first switch may relay, when receiving the packet whose destination is the information processing apparatus, the packet based on the settings. Thus, it becomes possible to deliver a packet to a destination based on settings that are made in advance.

Moreover, the making may include: (c2-3) making the settings further based on a source address included in the assignment request and a source address included in the response. And the third process may further include: (c2-4) converting, based on the settings, an address included in the packet whose destination is the information processing apparatus, upon receiving the packet; and relaying, based on the settings, the packet whose address is converted. Thus, it becomes possible to perform conversion of an address included in a packet at each switch. For example, in case of FCoE, it becomes possible to perform conversion of an address, which is performed by FCF, at other switches. Therefore, it becomes possible to prevent a packet from passing through the FCF.

Moreover, the first process may further include: (b2) transmitting a termination request whose destination is the management apparatus. And the second process may further include: (c1-1) determining whether assignment of the identifier to the information processing apparatus can be terminated, based on the termination request; and transmitting a response to the termination request, upon determining that the assignment of the identifier to the information processing apparatus can be terminated. And the third process may further include: (c2-5) deleting the settings; and transmitting a deletion request that includes the identifier assigned to the information processing apparatus to the first other switches. Thus, it becomes possible to delete settings in each switch that belongs to the same domain.

Moreover, (c3) a second switch that is a switch of the plural switches and belongs to a second domain transmits, upon receiving the assignment request, information on a logical link that received the assignment request to a third switch that is one of switches belonging to the second domain and manages settings, (c4) a fourth switch that is a switch of the plural switches and belongs to the second domain transmits, upon receiving the response, the response to the third switch, (c5) and the third switch makes settings for relaying a packet whose destination is the information processing apparatus based on the information on the logical link received from the second switch and the identifier included in the response received from the fourth switch and transmits information on a logical link that received the assignment request and the identifier included in the response to second other switches that belong to the second domain. A switch that relays the assignment request in a certain domain is not always the same as a switch that relays the response. As described above, by providing a switch that performs management of setting, it becomes possible to handle a case in which a switch that relays an assignment request and a switch that relays a response are different.

An information processing system relating to a second aspect of this embodiment includes: plural switches that are connected in a tree form; an information processing apparatus that is connected to one of the plural switches; and a management apparatus that is connected to one of the plural switches and manages assignment of identifiers. And the information processing apparatus includes: a transmitter that transmits an assignment request whose destination is the management apparatus. And the management apparatus includes: a determination unit that determines whether an identifier can be assigned to the information processing apparatus, based on the received assignment request; and a transmitter that transmits a response that includes an identifier assigned to the information processing apparatus, upon determining that the identifier can be assigned to the information processing apparatus. And a first switch that is a switch of the plural switches and relays the assignment request and the response includes: a making unit that makes settings for relaying a packet whose destination is the information processing apparatus, based on information on a logical link that received the assignment request and the identifier included in the response; and a transmitter that transmits, to first other switches that belong to a first domain to which the first switch belongs, a setting request that includes the information on the logical link that received the assignment request and the identifier included in the response.

Incidentally, it is possible to create a program causing a processor to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing system, comprising:
   a plurality of switches, each of which is classified to any one of a plurality of domains that are connected in a form of a tree, wherein a plurality of physical links between two domains among the plurality of domains are set as one logical link;
   an information processing apparatus connected to one of the plurality of switches; and
   a management apparatus connected to one of the plurality of switches, which manages assignment of channel IDs, wherein
   the information processing apparatus comprises:
      a first memory; and
      a first processor coupled to the first memory and configured to transmit an assignment request whose destination is the management apparatus,
   the assignment request is relayed from the information processing apparatus to the management apparatus via a first switch among the plurality of switches,
   the first processor receives a response for the assignment request from the management apparatus,
   the response for the assignment request includes a channel ID,
   the first switch comprises:
      a second memory; and
      a second processor coupled to the second memory and configured to:
         upon receiving the response for the information processing apparatus from the management apparatus, makes first settings for relaying a packet whose destination is the information processing apparatus, based on the channel ID included in the response and an identifier of a first logical link that includes a first plurality of physical links and through which the assignment request was received, wherein the first switch and at least one second switch belong to a first domain among the plurality of domains, the first domain being connected to a second domain among the plurality of domains through the first logical link, the second domain including one or more switches and the second domain being a lower-layer domain than the first domain in the tree; and
         transmits, to the at least one second switch, a request to make second settings for relaying the packet whose destination is the information processing apparatus, wherein the request includes the identifier of the first logical link and the channel ID included in the response.

2. The information processing system as set forth in claim 1, wherein the at least one second switch makes the second settings based on the identifier of the first logical link and the channel ID.

3. The information processing system as set forth in claim 1, wherein when receiving the packet whose destination is the information processing apparatus, the first switch relays the packet based on the first settings.

4. The information processing system as set forth in claim 1, wherein
   the making the first settings is based on a first source address included in the assignment request and a second source address included in the response, and
   the second processor is further configured to:
      convert, upon receiving the packet and based on the first settings, an address included in the packet whose destination is the information processing apparatus; and
      relay, based on the first settings, the packet including the address that is converted.

5. The information processing system as set forth in claim 1, wherein
the first processor is further configured to transmit a termination request whose destination is the management apparatus, and
the second processor is further configured to:
   delete the first settings in response to a second response that is a response to the termination request; and
   transmit a deletion request, that includes the identifier assigned to the information processing apparatus, to the at least one second switch.

6. The information processing system as set forth in claim 1, wherein
a third switch, upon receiving the assignment request, transmits a second identifier of a second logical link to a fourth switch, the third switch being of the plurality of switches and belonging to the second domain, the second logical link including a second plurality of physical links and being through which the assignment request was received by the third switch, and the fourth switch being of the plurality of switches and belonging to the second domain and configured to manage settings,
a fifth switch, upon receiving the response, transmits the response to the fourth switch, the fifth switch being of the plurality of switches and belonging to the second domain, and
the fourth switch makes, based on the identifier included in the response received from the fifth switch and the identifier of the second logical link, which is received from the third switch, third settings for relaying the packet whose destination is the information processing apparatus and transmits the identifier of the second logical link and the identifier included in the response to other switches that belong to the second domain.

7. A control method, comprising:
upon detecting that a response, which includes a channel ID assigned to an information processing apparatus, was received from a management apparatus that manages assignment of channel IDs and that is connected to one of a plurality of switches, wherein each switch of the plurality of switches is classified to any one of a plurality of domains that are connected in a form of a tree, a plurality of physical links between two domains among the plurality of domains are set as one logical link, and the information processing apparatus is connected to another switch of the plurality of switches:
   making, by a first switch among the plurality of switches and that relays an assignment request that was transmitted before the response by the information processing apparatus to request for assignment of a channel ID, first settings for relaying a packet whose destination is the information processing apparatus, based on the channel ID included in the response and an identifier of a first logical link that includes a first plurality of physical links and through which the assignment request was received, wherein the first switch and at least one second switch belong to a first domain among the plurality of domains, the first domain being connected to a second domain among the plurality of domains through the first logical link, the second domain including one or more switches and the second domain being a lower-layer domain than the first domain in the tree; and
   transmitting, by the first switch and to the at least one second switch, a request to make second settings for relaying the packet whose destination is the information processing apparatus, wherein the request includes the identifier of the first logical link and the channel ID included in the response, wherein the response is received by the information processing apparatus via the first switch.

8. The control method as set forth in claim 7, further comprising:
making, by the at least one second switch, the second settings based on the identifier of the first logical link and the channel ID.

9. The control method as set forth in claim 7, further comprising:
relaying, by the first switch when receiving the packet whose destination is the information processing apparatus, the packet based on the first settings.

10. The control method as set forth in claim 7, wherein
the making is based on a first source address included in the assignment request and a second source address included in the response, and
the control method further comprises:
   converting, by the first switch upon receiving the packet and based on the first settings, an address included in the packet whose destination is the information processing apparatus; and
   relaying, by the first switch and based on the first settings, the packet including the address that is converted.

11. The control method as set forth in claim 7, further comprising:
upon detecting a second response from the management apparatus to the information processing apparatus, which is a response to a termination request from the information processing apparatus to the management apparatus:
   deleting the first settings; and
   transmitting, by the first switch, a deletion request that includes the identifier assigned to the information processing apparatus to the at least one second switch.

12. The control method as set forth in claim 7, further comprising:
transmitting, by a third switch of the plurality of switches that belongs to the second domain and upon receiving the assignment request, an identifier of a second logical link to a fourth switch, the second logical link including a second plurality of physical links and through which the assignment request was received, and the fourth switch being of the one or more switches belonging to the second domain and configured to settings;
transmitting, by a fifth switch of the plurality of switches that belongs to the second domain and upon receiving the response, the response to the fourth switch;
making, by the fourth switch and based on the identifier included in the response received from the fifth switch and the identifier of the second logical link, which is received from the third switch, third settings for relaying the packet whose destination is the information processing apparatus, and
transmitting, by the fourth switch, the identifier of the second logical link and the identifier included in the response to other switches that belong to the second domain.

* * * * *